(12) United States Patent
Bobbili et al.

(10) Patent No.: US 11,538,478 B2
(45) Date of Patent: Dec. 27, 2022

(54) MULTIPLE VIRTUAL ASSISTANTS

(71) Applicant: Amazon Technologies, Inc., Seattle, WA (US)

(72) Inventors: Naveen Bobbili, Campbell, CA (US); Prajwal Deepak Shimpi, Santa Clara, CA (US); Saurabh Kumar Kulkarni, San Jose, CA (US)

(73) Assignee: Amazon Technologies, Inc.

( * ) Notice: Subject to any disclaimer, the term of this patent is extended or adjusted under 35 U.S.C. 154(b) by 203 days.

(21) Appl. No.: 17/114,047

(22) Filed: Dec. 7, 2020

(65) Prior Publication Data
US 2022/0180867 A1 Jun. 9, 2022

(51) Int. Cl.
| | |
|---|---|
| *G10L 15/22* | (2006.01) |
| *G06F 3/01* | (2006.01) |
| *G06F 3/16* | (2006.01) |
| *G10L 15/30* | (2013.01) |

(52) U.S. Cl.
CPC .............. *G10L 15/22* (2013.01); *G06F 3/017* (2013.01); *G06F 3/167* (2013.01); *G10L 15/30* (2013.01); *G10L 2015/223* (2013.01)

(58) Field of Classification Search
CPC .................................. G10L 15/22; G10L 15/30
See application file for complete search history.

(56) References Cited

U.S. PATENT DOCUMENTS

| | | |
|---|---|---|
| 10,692,489 B1 | 6/2020 | Grizzel |
| 2015/0053066 A1* | 2/2015 | Hampiholi ........... G06V 20/597 84/602 |

FOREIGN PATENT DOCUMENTS

| | | |
|---|---|---|
| WO | 2016085776 A1 | 6/2016 |
| WO | 2018009897 A1 | 1/2018 |

OTHER PUBLICATIONS

International Search Report and Written Opinion dated Apr. 5, 2022 for International Patent Application No. PCT/US2021/061713.

* cited by examiner

*Primary Examiner* — Ibrahim Siddo
(74) *Attorney, Agent, or Firm* — Pierce Atwood LLP

(57) ABSTRACT

A speech-processing system may provide access to multiple virtual assistants via one or more voice-controlled devices. Each assistant may leverage language processing and language generation features of the speech-processing system, while handling different commands and/or providing access to different back applications. Different assistants may be available for use with a particular voice-controlled device based on time, location, the particular user, etc. The voice-controlled device may include components for facilitating user interaction with multiple assistants. For example, a multi-assistant component may facilitate enabling/disabling assistants, assigning gestures and/or wakewords, etc. The multi-assistant component may handle routing commands to a command processing subsystem corresponding to an assistant invoked by the command. The voice controlled device may further include observer components, each configured to monitor the voice-controlled device for invocations of a particular assistant.

20 Claims, 23 Drawing Sheets

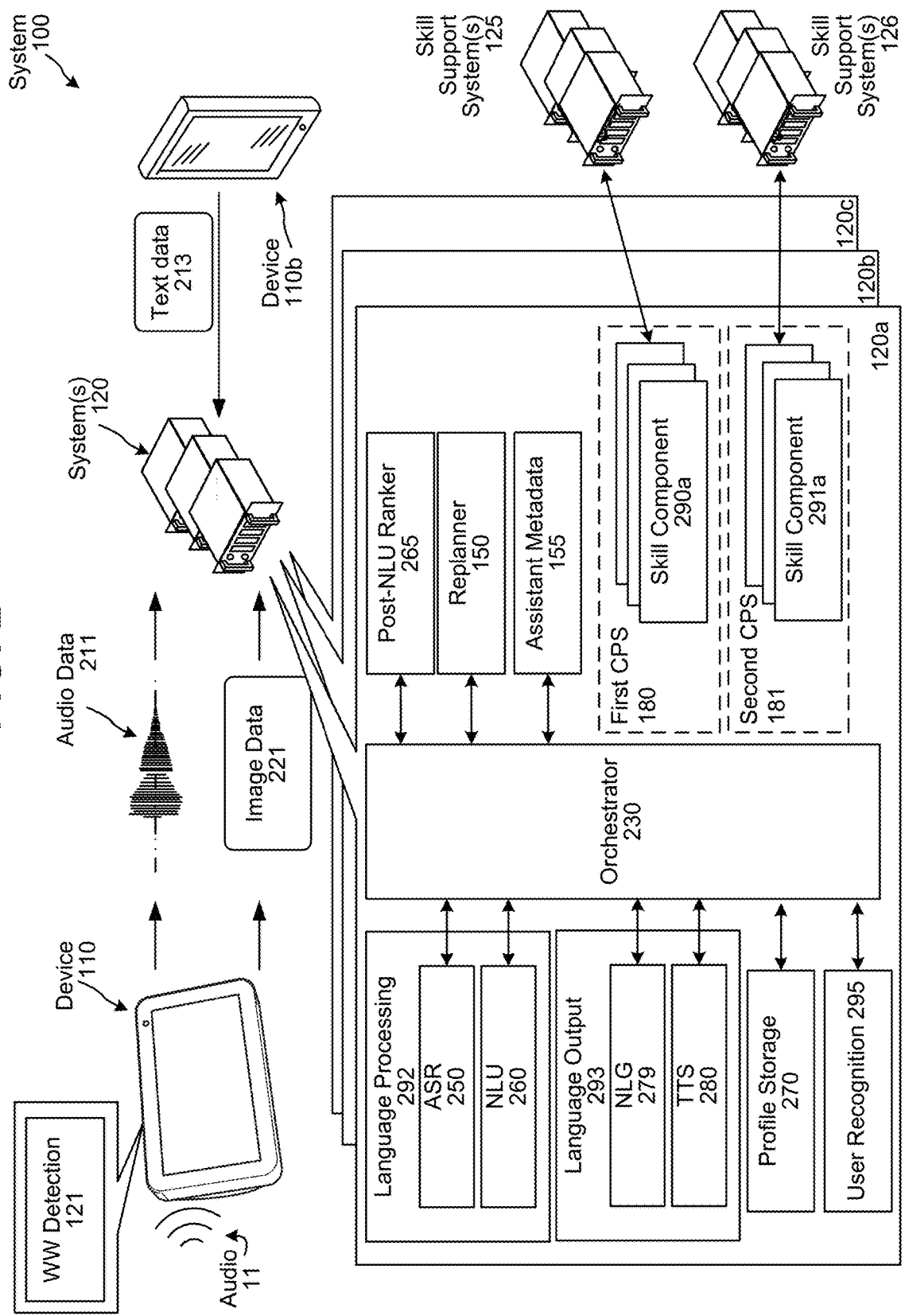

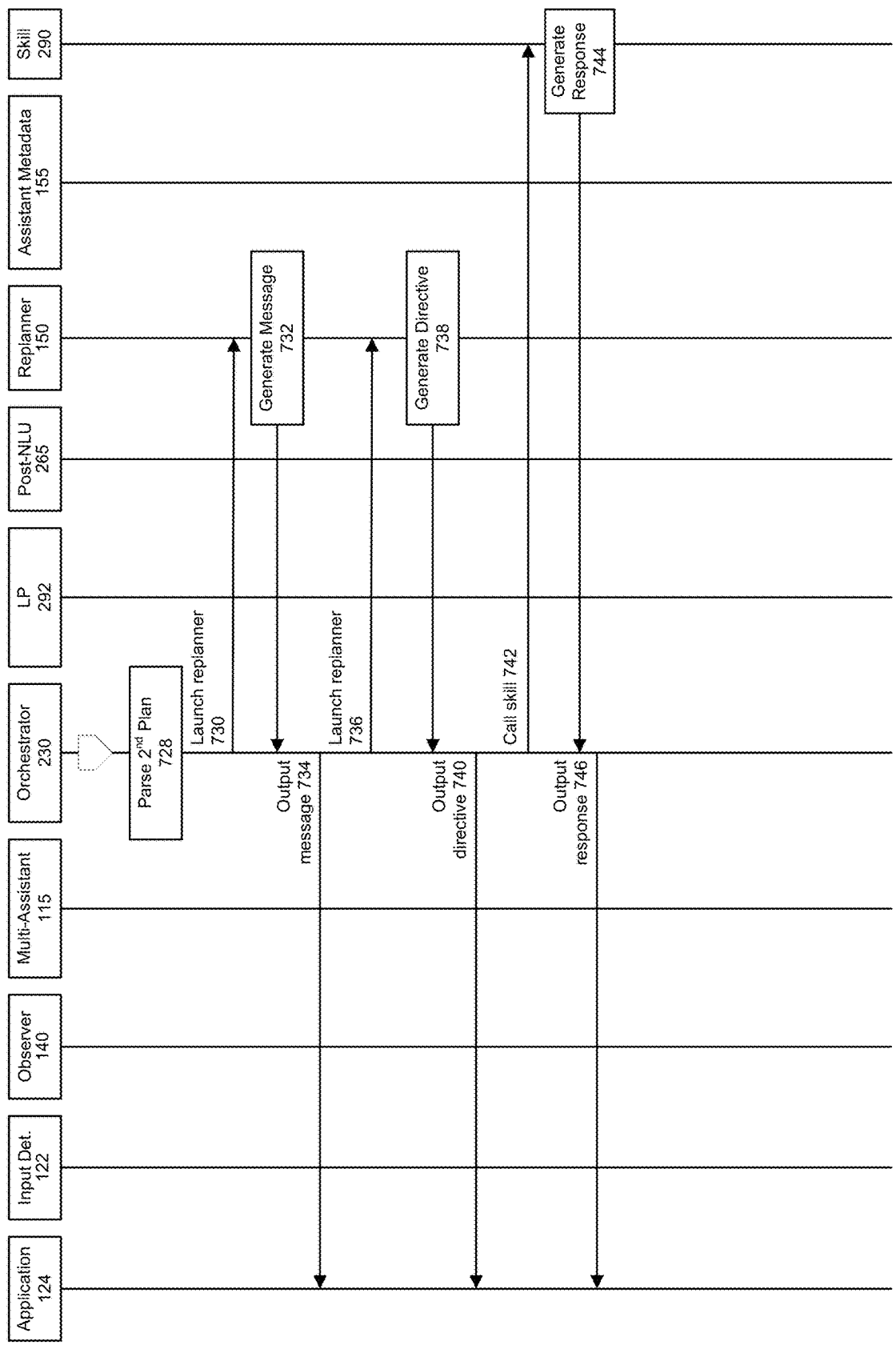

MULTIPLE VIRTUAL ASSISTANTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram illustrating components of the virtual assistant system, according to embodiments of the present disclosure.

FIGS. 7A and 7B signal flow are diagrams illustrating example operations for handling a command by performing a handoff to an assistant different from the assistant requested for handling the command, according to embodiments of the present disclosure.

DETAILED DESCRIPTION

Figure 1A:
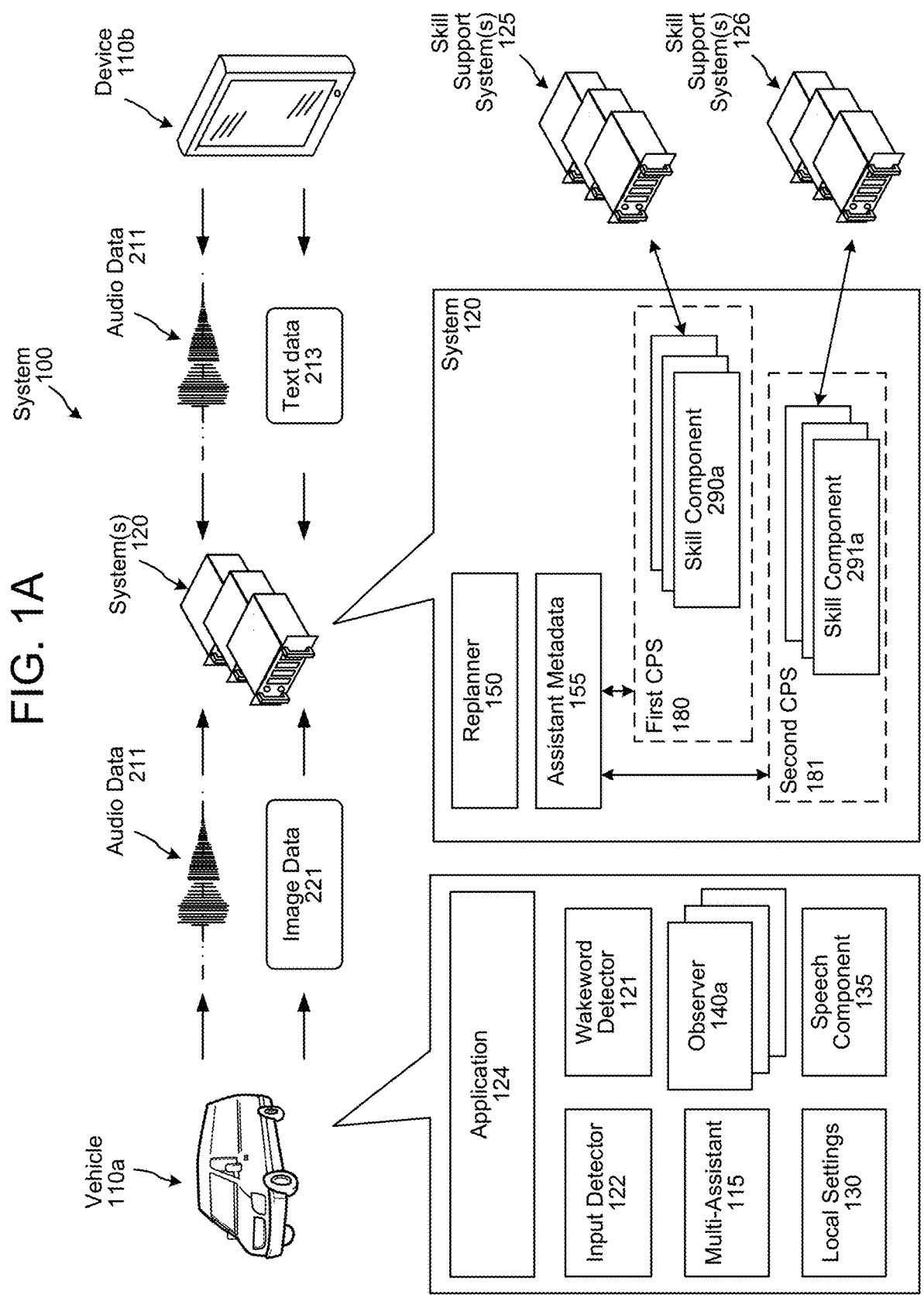
FIG. 1A is a conceptual diagram illustrating components of a device in a virtual assistant system for managing and coordinating a natural language dialog involving multiple command processing subsystems, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU are often used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together as part of a speech-processing system. The speech processing system can function as an assistant system, which can leverage additional applications, skills, and/or speechlets to perform tasks for and/or on behalf of the user.

A voice-controlled user device and/or a remote system may be configured to receive a spoken user input and, using ASR, detect a wakeword and/or other text in the user input. The device and/or system may determine a command in the user input using NLU and provide a response to the command using TTS and/or other user interface component(s).

In some embodiments, the voice-controlled user device and/or the remote system may be configured to detect a gesture; that is, a non-verbal movement detectable by the device. The voice-controlled user device and/or the remote system may be configured to process a spoken user input received with and/or following the detected gesture. A user may thus control the voice-controlled user device, another user device, and/or the remote system by voice. In some embodiments, in response to the user device detecting the wakeword and/or gesture, the user device may send input data representing the user input to the remote system for further processing. The remote system may further process the input data to verify that it includes a representation of the wakeword and/or to determine the command. The user device may then receive, from the remote device, output audio, video, or other data related to a response to the command and/or other data required to perform an action associated with the response.

A user may be able to interact with more than one assistant using the speech-processing system. Each assistant may be embodied in a respective command processing subsystem (CPS) and described further herein. One CPS may be configured to offer a different user experience and/or different services than another CPS. For example, a first CPS may facilitate online shopping, while a second CPS may provide vehicle navigation. A user may thus wish to direct online-shopping commands to the first assistant, and wish to direct navigation commands to the second assistant. A user may invoke a particular assistant with a wake command. A wake command may be a command that may cause the device to change a mode and/or may cause further processing of input data; for example, performing speech processing, sending audio data to another component for speech processing, etc. A wake command may be a wakeword and/or gesture (e.g., a non-verbal movement). A wake command may be associated with an assistant. For example, a first assistant may be invoked using the wakeword "Alexa" and/or a press-and-hold gesture, while a second assistant may be invoked using the wakeword "Hal" and/or a tap-to-talk gesture. Wake commands may be user-assignable. Each assistant may, in addition to being associated with its own, maybe unique, interpretation of commands, provide its own, maybe unique responses, and/or otherwise be perceived as having a particular "personality." This personality may include, for example, a particular albeit artificial speaking voice and/or style, such as "newscaster" or "celebrity." An assistant may respond with synthesized speech (generated by, for example, the TTS component) exhibiting aspects of the personality. A user may thus come to associate a certain assistant with a certain personality and thus recognize synthesized speech as being associated with a particular assistant by recognizing the personality.

Functions of an assistant may be provided by the speech-processing system via one or more CPSs. A voice-controlled device may include various components for facilitating interaction with multiple CPSs. The device may include a wakeword detector and/or an input detector for detecting a verbal invocation of a CPS (e.g., with a wakeword), or a gestured invocation of a CPS (e.g., with a non-verbal movement detectable by the device). The device may include a multi-assistant component for managing settings related to the CPS such as enabling/disabling and/or assigning wake commands to individual CPSs. The multi-assistant component may handle updates to local settings and/or cloud settings related to various CPSs. The voice-controlled device may have an observer component associated with each CPS enabled for use with the device. An observer component may detect when a wakeword and/or gesture associated with the CPS is received. The voice-controlled device may additionally include lights and/or a display for presenting visual information according to assistant-specific themes, such as light colors/patterns and/or images, that can indicate which CPS is currently active. The visual themes may further indicate a status of a CPS such as listening, thinking, speaking, etc.

Each CPS may include settings and/or resources used by the speech-processing system to provide the functions of the corresponding assistant. In some embodiments, multiple CPSs may share certain resources of the speech-processing system; for example, the ASR component(s), NLU component(s), and/or TTS component(s). In other embodiments, however, each CPS may have its own dedicated ASR component(s), NLU component(s), and/or TTS component(s).

Each CPS may be associated with different back-end applications, speechlets, and/or skills. For example, a first CPS may be associated with a shopping skill and a second CPS may be associated with a vehicle navigation skill.

Each CPS may be associated with certain settings and/or other data maintained in a respective or shared assistant metadata component. The assistant metadata component may include information regarding functionality of CPSs, such as which CPSs are available with respect to a particular device and/or location, and which commands and/or skills are associated with a CPS. The assistant metadata component may include information regarding user experience (e.g., assistant "personalities"), such as which wake commands are associated with each CPS, light patterns and/or images that give a visual indication of the active CPS, TTS parameters and settings for giving a CPS a distinctive voice, etc. In some implementations, CPS-specific data such as intent and/or entity libraries, etc., may be provided to language processing components to streamline and/or augment language processing, and provide more accurate results.

In some situations, a user may invoke a first assistant for handling a command; for example, using a wake command associated with a first CPS. The speech-processing system may determine, however, that the command may be better handled by a second assistant associated with a second CPS. For example, the speech-processing system may determine a skill for executing the command, and further determine that the skill is associated with the second CPS but not the first CPS. The speech-processing system may thus perform a handoff from the first CPS to the second CPS. The speech-processing system may provide indications of the handoff for the purpose of informing the user of the transfer of responsibility from the first assistant to the second assistant. In doing so, the speech-processing system may perform operations corresponding to both the first CPS and the second CPS. This may present technical challenges related to providing outputs according to settings associated with distinct CPSs, the relative timing of the outputs, and routing of the command to the skill for execution.

The speech-processing system can therefore include a replanner component for orchestrating the various operations related to the handoff and command execution. The replanner component may generate plan data representing a sequence of operations for performing the handoff. The operations may include user experience operations such as providing verbal or non-verbal output via the device, and command processing operations such as calling a skill to execute with respect to the command. The replanner component may receive information indicating a requested CPS (e.g., representing the assistant invoked by the user), a skill, an intent, and a selected CPS for handling the skill/intent. The replanner component may use this data to generate plan data including operations for providing indications of the handoff and invoking the selected CPS for executing the command. For example, the plan data may include an operation to provide a verbal output based on the settings of the first CPS (that is, in the personality of the first assistant) announcing the handoff: "Hm, maybe Hal can help you with that." The plan data may include an operation to call a skill associated with the second CPS to execute the command. In some implementations, the replanner component may additionally select a handoff type. For example, rather than have the first CPS announce the handoff, the replanner may select a barge-in handoff type in which the selected CPS rather than the requested CPS announces the handoff: "Hal here. I can help you with that." In some implementations, the replanner may select the handoff type based on the identity of the requested CPS and/or the selected CPS. In some implementations, the replanner may select the handoff type based on the intent and/or skill. In some implementations, the replanner may select the handoff type based on user settings and/or a device type of the user device. Each handoff type may be associated with a template. The replanner component may use the template to generate plan data according to a selected handoff type. Rules for choosing a handoff type and templates for generating corresponding plan data may be provided by the assistant metadata component. These and other features of embodiments of the disclosure are detailed further below with reference to the accompanying figures.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a device in a virtual assistant system 100 for managing and coordinating a natural language dialog involving multiple command processing subsystems (CPSs) 180 and 181, according to embodiments of the present disclosure. The various components may be located on same or different physical devices. Communication between various components may occur directly or across a network(s) 199. The system 100 may include one or more voice-controlled devices 110 in communication with a speech-processing system 120 (abbreviated "system 120"). The system 120 may provide inputs to a first CPS 180, a second CPS 181, and/or additional CPSs. The voice-controlled devices may include, for example, a vehicle 110a and/or a tablet computer 110b. Other devices 110 such as those illustrated in FIG. 17 and described below with reference to FIG. 15 may be used. As described in greater detail below, the device 110 may include a wakeword detector 121 for detecting one or more wakewords, an input detector 122 for detecting user input such as a gesture (e.g., a button press or touch-screen touch), and one or more applications 124 for receiving input, providing output, and/or changing a state of the device 110. In some implementations, the input detector 122 and/or the wakeword detector 121 may be components of the application 124. In some implementations, the input detector 122 and/or the wakeword detector 121 may be standalone components. The device 110 may include a microphone for receiving an audio signal. The wakeword detector 121 may determine that audio data corresponding to the audio contains a representation of a wakeword (as described in greater detail below); the device 110 may thereafter send the audio data to the system(s) 120. An example wakeword is "Alexa." The device 110 may instead or in addition send the audio data to the system(s) 120 when an input detector 122 detects an input—such as a key press, button press, or touch-screen touch—corresponding to sending the audio data is detected. An example button is a "Push to Talk" button. The button and/or the input detector 122 may be capable of differentiating gestures such as tap-to-talk, push-and-hold, double-click, etc. In any event, the device 110 receives the audio 11, and sends corresponding input data to the server 120 as audio data 211, text data, a phonetic representation of the command, etc. As described in FIG. 3, however, additional language processing and command execution operations can be performed on the device 110, and the disclosure is not limited by whether the device 110 and/or system 120 performs operations described herein.

Once the wakeword is detected by the wakeword detector 121 and/or input is detected by the input detector 122, the device 110 may wake and begin transmitting audio data 211, representing the audio signal, to the system(s) 120. The device 110 may include a speech component 135, described further below, that may transmit the audio data 211 to the system 120. The audio data 211 may include data corresponding to the wakeword; in other embodiments, the portion of the audio corresponding to the wakeword is removed by the device 110 prior to sending the audio data 211 to the system(s) 120. In the case of touch input detection, the audio data 211 may not include a wakeword. The device 110 may be equipped with a camera for capturing image data 221. The device 110 and/or the system 120 may process the image data 221 for purposes of gesture detection (e.g., when the gesture does not include touching a touch- or force-sensitive component), for user recognition, or for detecting context (e.g., is it day/night). The device 110 may also receive text input (or generate text data 213 based on an input) and transmit the text data 213 to the system 120.

The device 110 may include a multi-assistant component 115. The multi-assistant component 115 can receive and process requests to enable and/or disable CPS, such as the first CPS 180 and/or the second CPS 181 for handling commands received by the device 110. The multi-assistant component 115 can process changes in assistant settings, such as setting CPS-specific wakewords and/or gestures. The multi-assistant component 115 can distill the settings change request by seeing how the requested setting differs from the current settings state stored in the local settings component 130, update the local settings component 130 with the new settings, transmit the new settings to the system 120, and assign an observer component 140 to the CPS. The multi-assistant component 115 may retrieve eligible CPS information from system 120 to provide the user with a list of assistants that may be eligible for use with the voice-controlled device 110. The multi-assistant component 115 is described in additional detail below with reference to FIG. 1B.

The device 110 may include a local settings component 130. The local settings component 130 can be a memory or storage that maintains settings related to the one or more CPSs eligible and/or enabled for the device 110. When the user requests a change to assistant settings, the multi-assistant component 115 can refer to the local settings component 130 to determine how the requested setting change differs from the current settings state stored in the local settings component 130. Following this process of distillation, the multi-assistant component 115 can transmit an indication of one or more assistant settings that have changed to the system 120. The system 120 may include a remote settings storage in, for example, the assistant metadata component 155.

The device 110 may include a speech component 135. The speech component 135 may receive input audio data from the application 124 and forward it to the system 120 for processing. In some implementations, the speech component 135 may include speech and/or language processing components such as those described with respect to the language processing component 392 described below with reference to FIG. 3. In some implementations, the speech component 135 may receive input audio data and send it to the system 120 in its original form; that is, as unprocessed audio data. In some implementations, the speech component 135 may process the audio data and transmit the resulting data in the form of ASR data such as phonemes or text, or NLU data in the form of an intent, entity identifiers, and/or slot data.

The device 110 may include one or more observer components 140a, 140b, and 140c, etc. (collectively "observer components 140"). The multi-assistant component 115 may assign an observer component 140 to each CPS enabled for the device 110. The observer component 140 can monitor the application 124, input detector 122, and/or wakeword detector 121 for invocations of the CPS for which it is assigned. The observer component 140 may notify the system 120 of assistant CPS invocation and provide the system 120 with audio data 211, image data 221, and/or text data 213 associated with the invocation.

The application 124 may execute on the device 110 to provide a user interface. The application 124 may handle input and output functions of the device 110 that relate to the CPS and the speech-processing system. In some implementations, the application 124 may be an original equipment manufacturer (OEM) application for, for example, a manufacturer of the vehicle 110a. In some implementations, the application 124 may be a default application as provided for the device 110. The application 124 may detect inputs received via a microphone, camera, touchscreen, buttons, and/or other sensors of the device 110. The application 124 may execute outputs from the device 110 via a speaker, light, display, and/or other peripherals and actuators. For example, the application 124 may be capable of adjusting parameters of the device 110, such as output volume, actuating locks or windows of a vehicle 110a, turning the device 110 on or off, etc. The application 124 may work in conjunction with the wakeword detector 121, input detector 122, multi-assistant component 115, local settings 130, and/or observers 125 to provide a user of the application 124 with access to the CPSs 180 and/or 181 via the speech-processing system 120.

The system 120 may include speech processing components including components for ASR, NLU, TTS, etc. as further detailed below with reference to FIG. 2. The system 120 additionally includes components configured to process commands received in a multi-assistant environment. In particular, the system 120 includes a replanner component 150, the assistant metadata component 155, a first CPS 180, and a second CPS 181. The first CPS may be associated with one or more skill components 290a, 290b, and 290c (collectively "skill components 290"), and the second CPS may be associated with one or more skill components 291a, 291b, and 291c (collectively "skill components 291"). The system 120 is not limited to two CPSs, and in some implementations may include many CPSs. In some embodiments, one or more skill components 290 or 291 may be shared between two or more CPSs. In some embodiments, the system 120 may include more or fewer skill components 290 or 291, including skill components for additional CPSs. The skill components 290 and/or 291 may communicate with one or more skill support systems 125 or 126, which may augment the resources of the skill components 290 or 291, respectively.

A CPS 180 and/or 181 may include software and/or logic configured to provide the functions of a virtual assistant to the user. The software and/or logic may exist in shared resources of the system 120 (e.g., memory and/or processors), or in distinct dedicated resources. The CPSs 180 and/or 181 may receive calls and/or other data from the orchestrator component 230 (described further below) and return responses to the orchestrator component 230. The CPSs 180 and/or 181 may also store and retrieve data to/from the assistant metadata component 155, such as settings specific to a CPSs 180 and/or 181 and/or to particular users of the CPSs 180 and/or 181. Data provided by the assistant metadata component 155 may be used by the CPSs 180 and/or 181 to project a "personality" in the form of an identifiable voice and/or visual themes. The CPSs 180 and/or 181 may each operate in conjunction with the skill components 290 and/or 291, respectively. In some operations, for example, a user may invoke the first CPS 180 for handling a command associated with a skill 291 corresponding to the second CPS 181. In some cases, the replanner component 150 may prescribe operations to effect a handoff of the command from the first CPS 180 to the second CPS 181 as described further below.

The replanner component 150 may be configured to determine when a requested CPS 180 or 181 differs from assistant selected CPS 180 or 181 for handling the command, and take action. For example, if a user utters a command, "Alexa, roll up the windows," an NLU component and/or a post-NLU ranker may determine that Alexa may not be the best assistant for activating features of a vehicle 110a, and that Hal may be a more appropriate assistant. Thus the NLU component and/or the post-NLU ranker may return skill and intent data, and further indicate a requested CPS 180 (in this case, corresponding to Alexa) and assistant selected CPS 181 (in this case, corresponding to Hal). The replanner component 150 may receive the NLU result data and based on the mismatch between requested and acting CPSs, generate plan data that the system 120 can parse to, for example, generate outputs indicating the handover execution of the user command from Alexa to Hal, and to further cause execution in response to the command by the application 124 and/or one of the skill components 291. Using the plan, the speech-processing system can provide the user with an indication of the handover followed by a response and/or an execution of the command, with each visual, verbal, and/or non-verbal output delivered in the style of the appropriate CPS 180 or 181 and timed to provide the user with an intuitive indication of the which assistant is handling the command. In some implementations, the replanner component 150 may be implemented as a skill component 290 or a skill system 125.

The assistant metadata component 155 may be a memory or storage configured to store information related to CPSs 180 and 181 provided by the system 120. The assistant metadata component 155 can store information about which CPS[s] is/are available for a given user, device 110, location, etc. The assistant metadata component 155 may store settings for CPSs 180 and 181 including which CPSs 180 or 181 are enabled for a particular user and/or device. The assistant metadata component 155 may store wake command (e.g., wakeword and/or gesture) information associated with assistant CPS 180 or 181 for a given user and/or device 110. In some embodiments, the assistant metadata component 155 may mirror the information stored in the local settings component 130. The assistant metadata component 155 may store ASR, NLU, and/or entity libraries associated with each assistant for use by the system 120 during language processing. The assistant metadata component 155 may also store speech style information for each CPS 180 and 181 for use by a TTS component of the system 120 for providing verbal output in a style recognizable by a user as a personality indicating the identity of the assistant. The assistant metadata component 155 may store information regarding non-verbal indications of the CPS 180 and 181, such as colors, earcons, voice chromes, etc. indicative of the identity of an assistant. The assistant metadata component 155 may include one or more templates describing a syntax for plan data for different handoff types. Each handoff type may be associated with a template. The replanner component may 150 use a template to generate plan data according to a selected handoff type. Rules for choosing a handoff type and templates for generating corresponding plan data may also be provided by the assistant metadata component 155. The replanner component 150 may determine a handoff type to use based on parameters of the first plan data and/or other context. The replanner component 150 may retrieve a template for the determined handoff type from the assistant metadata component 155 and use the template to generate the plan data. The template may specify one or more sections (e.g., data fields) to be included in the plan, where each section corresponds to an operation to be performed by the system. The template may specify a format of the sections. For example, the template may describe an operation according to a handoff pre-roll; that is, a message informing a user that a CPS other than the requested CPS will handle the user's command. The template may describe that the pre-roll data field include an instruction to launch the replanner component 150 with a payload reflecting a setting of the first CPS for the purpose of generating a verbal message to the user using TTS settings associated with the first CPS. Similarly, the template may describe a post-roll data field that may be used for a barge-in handoff type. The post-roll data field may include an instruction to launch the replanner component 150 to generate a verbal message in a second speech style associated with the second CPS. The template may describe a command execution section that may include an instruction to call a skill or skill system based on a setting associated with the second CPS. The template may describe additional operations for other handoff types, including updating visual themes presented by the device for indicating visually which CPS is active at a given moment. The template may specify an order of the operations as reflected by the order of sections in the plan data. The replanner component 150 may use a template from the assistant metadata component 155 corresponding to the determined handoff type to generate plan data.

Figure 1B:
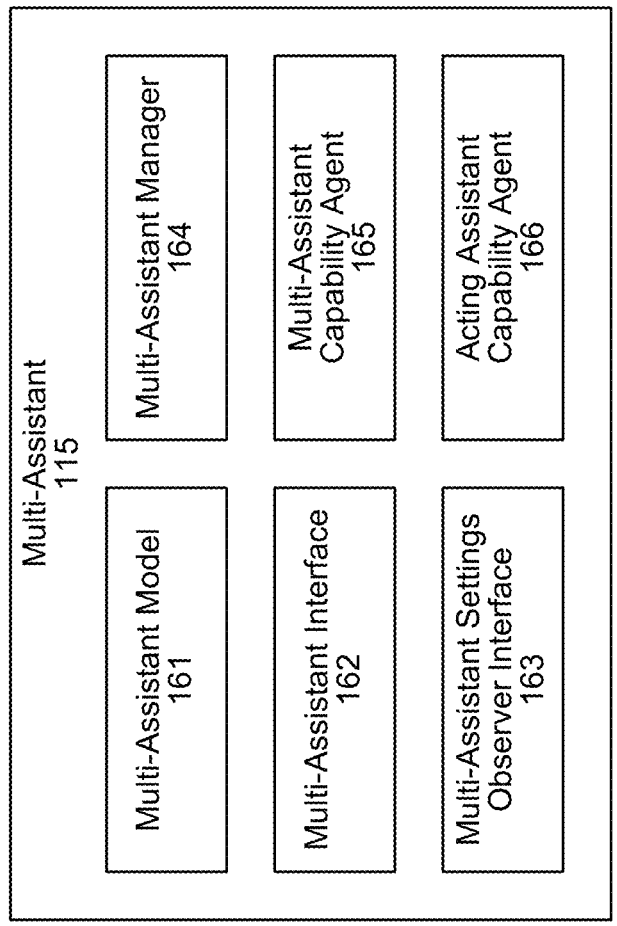
FIG. 1B is a conceptual diagram illustrating components of a multi-assistant component, according to embodiments of the present disclosure.

FIG. 1B is a conceptual diagram illustrating components of the multi-assistant component 115, according to embodiments of the present disclosure. The multi-assistant component 115 can include various components, models, and interfaces for performing operations related to multi-assistant operation of the device 110. The multi-assistant component 115 can include a multi-assistant model 161, a multi-assistant interface 162, a multi-assistant settings observer interface 163, a multi-assistant manager 164, a multi-assistant capability agent 165, and an acting assistant capability agent 166. In some implementations, the multi-assistant component 115 may include only a subset of these elements or additional elements.

The multi-assistant model 161 may be a software class that may define one or more data structures that may represent one or more attributes of a CPS 180, 181. The attributes may include an assistant ID of a CPS 180, a gesture associated with the CPS 180, whether or not the CPS 180 is enabled for use on the device, etc. The application 124 may use data according to the multi-assistant model 161 to register a CPS 180 with the multi-assistant manager 164.

The multi-assistant interface 162 may be implemented by the multi-assistant manager 164 to allow the application 124, as well as any other applications and/or clients executing on the device 110, to communicate a change in multi-assistant settings initiated using the application 124; for example, enabling/disabling a CPS 180, setting a gesture for a particular CPS 180, etc. When the multi-assistant component 115 assigns an observer component 140 for monitoring for invocations of, or settings changes to, a CPS 180, the observer component 140 may use the multi-assistant interface 162 to set itself as the observer component 140 for the CPS 180.

The multi-assistant settings observer interface 163 may be used to communicate multi-assistant setting changes to the application 124; for example, confirming that a CPS 180 has been enabled, that a gesture has been assigned to a CPS 180, etc. The multi-assistant settings observer interface 163 may notify an observer component 140 of a change in a configuration of a CPS 180.

The multi-assistant manager 164 is a component that may implement the multi-assistant interface 162 and the multi-assistant settings observer interface 163. The multi-assistant manager 164 may also handle setting a value of a multi-assistant setting when initiated through a request received via the application 124. The multi-assistant manager 164 may notify observer components 140 of a result of a change operation when a multi-assistant setting is changed locally via the application 124 or remotely using, for example, a companion application on another device 110 associated with a same user profile as the device 110. The multi-assistant manager 164 may also add itself as an observer component 140 to multi-assistant settings (and changes thereto) via the multi-assistant settings observer interface 163.

The multi-assistant capability agent 165 may receive from the system 120 data regarding CPSs 180 available for processing commands received by the device 110. The multi-assistant capability agent 165 can report settings for enabled CPSs 180 back to the system 120.

The acting assistant capability agent 166 can receive directives from the system 120 regarding the active CPS 180. The acting assistant capability agent 166 can notify the application 124 of the active CPS 180. The application 124 may then present a user interface indication corresponding to the active CPS 180; for example, an earcon (e.g., audible sound that may be indicate a function and/or status of a particular CPS), voice chrome (e.g., an image presented on a display that may be indicate a function and/or status of a particular CPS), light color/patterns, etc. Example user interface indications and how they relate to each CPS is described further below with reference to FIGS. 8-11.

The system 100 may operate using various components as described in FIG. 2. FIG. 2 illustrates various components of the system 120 described with references to FIG. 1A as well as additional components. The various components may be located on same or different physical devices. For example, in some implementations, components of the system 120 may reside in the device 110 or be shared between the device 110 and the system 120 as described below with reference to FIG. 3. Communication between various components may occur directly or across a network(s) 199 connecting one or more of the devices 110, system 120, and/or skill support systems 125. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 121. The wakeword detection component 121 may be configured to detect various wakewords. In at least some examples, each wakeword may correspond to a name of a different digital assistant corresponding to a different CPS 180 or 181. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1818 of the device 110 and may send image data 221 representing those image(s) to the system 120. The image data 221 may include raw image data or image data processed by the device 110 before sending to the system 120.

The wakeword detector 121 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 121 and/or input is detected by an input detector, the device 110 may "wake" and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection or gesture based input detection, the audio data may not include a wakeword.

The input detector 122 of the device 110 may detect user input such as a gesture (e.g., a button press or touch-screen touch). An example button is a "Push to Talk" button. The device 110 may send the audio data 211 captured after gesture detection to the system(s) 120. The button and/or the input detector 122 may be capable of differentiating gestures such as tap-to-talk, push-and-hold, double-click, etc. In any event, the device 110 sends the audio data 211 or data representing the received audio 11 and/or commands conveyed therein to the server 120.

In some implementations, the system 100 may include more than one system 120. The systems 120 may respond to different wakewords and/or gestures, and/or perform different categories of tasks. Each system 120 may be associated with its own wakeword such that speaking a certain wakeword results in audio data to be sent to and processed by a particular system. For example, detection of the wakeword "Alexa" by the wakeword detector 121 may result in sending audio data to system 120a for processing while detection of the wakeword "Hal" by the wakeword detector 121 may result in sending audio data to system 120b for processing.

In some implementations, the system 100 may include more than one CPS 180 and 181, each representing a virtual assistant having a different "personality" and abilities to provide different services and/or access to different skills. Each CPS 180 or 181 may be invoked by a different wakeword and/or gesture. The system 100 may have a separate wakeword and system for different skills/systems (e.g., "Dungeon Master" for a game play skill/system 120c) and/or such skills/systems may be coordinated by one or more skill(s) 290 of one or more systems 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 9.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 125, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

In some implementations, the NLU component 260 and/or the ASR component 250 may leverage models, grammars, lexicons, and/or other libraries of data for use in processing natural language inputs. Performance of the system 100 may be improved through use of libraries specific to the virtual assistants available via the system or currently enabled for a particular user/device 110 providing the natural language input. Upon receiving input data related to a natural language input, the system 120 may retrieve a list of enabled and/or available CPSs 180 and 181, e.g., from the profile storage 270 and/or the assistant metadata component 155, and process the natural language input based on libraries associated with the assistants present in the list(s).

The NLU component 260 may return NLU results data 1185/1125 (which may include tagged text data, indicators of intent, etc.) back to the orchestrator component 230. The orchestrator component 230 may forward the NLU results data to a skill component(s) 290. If the NLU results data includes a single NLU hypothesis representing a skill associated with the CPS 180 or 181 corresponding to the assistant invoked by the user command, the NLU component 260 and the orchestrator component 230 may direct the NLU results data to the skill component(s) 290 associated with the NLU hypothesis. If the NLU results data 1185/1125 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265. The NLU component 260, post-NLU ranker 265 and other components are described in greater detail below with regard to FIGS. 10 and 11.

The system 120 may provide the NLU results data and/or metadata related to the input audio data as inputs to a CPS 180 or 181. A CPS 180 or 181 may be associated with one or more skill components 290 or 291. A skill component may be software running on the system(s) 120 that is akin to a software application. That is, a skill component 290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator component 230.

Skills 290 and 291 may be associated with a particular CPS 180 or 181. In some cases, the system 120 may determine that assistant CPS 180 or 181 other than the CPS 180 or 181 invoked by the input data (e.g., indicated by a wakeword and/or gesture received with input audio data) is better able to handle a request or command represented in the input data. For example, the input data may indicate an intent corresponding to a skill that is not enabled for the requested CPS. In such cases, the orchestrator component 230 may provide the NLU result data along with the requested assistant to the replanner component 150. The replanner component 150 may determine that the requested assistant (e.g., corresponding to CPS 180) does not match the selected assistant (e.g., corresponding to CPS 181) for handling the skill/intent indicated by the NLU result data. Accordingly, the replanner component 150 may generate plan data indicating additional operations the system 120 may take with respect to the input data. The replanner component 150 may return the plan data to the orchestrator component 230 for further processing.

The system 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1410 discussed below). Alternatively or in addition, the TTS component 280 may receive text data from a skill 290 or other system component for output.

The NLG component 279 may include a trained model. The NLG component 279 generates text data 1410 from dialog data received by a dialog manager such that the output text data 1410 has a natural feel and, in some embodiments, includes words and/or phrases specifically formatted for a requesting individual. The NLG may use templates to formulate responses. And/or the NLG system may include models trained from the various templates for forming the output text data 1410. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

In some cases, the system 100 may provide access to multiple assistants via the CPSs 180 and 181 of the device 110 and/or the system 120. Each assistant may have its own personality as reflected in particular speech style. The language output component 293 may therefore provide different synthesized speech depending on the corresponding CPS 180 or 181. The language output component 293 may receive assistant metadata from the orchestrator component 230, skill 290/91, and/or the replanner component 150, etc. The language output component 293 may retrieve speech style data for the CPS 180 or 181 corresponding to the active assistant from the assistant metadata component 155. The language output component 293 may use the speech style data to generate synthesized speech matching the personality of the active assistant.

The system(s) 120 may include a user recognition component 295 that recognizes one or more users using a variety of data, as described in greater detail below with regard to FIG. 13. However, the disclosure is not limited thereto, and the device 110 may include a user recognition component 395 instead of and/or in addition to user recognition component 295 of the system(s) 120 without departing from the disclosure. User recognition component 395 operates similarly to user recognition component 295.

User recognition data resulting from a user recognition process may be used to, for example, determine CPSs 180 and 181 enabled for a particular user with respect to the device 110. In some cases, different wakewords and/or gestures may be assigned to different CPSs 180 and 181 for different users. For example, a first user may use the wakeword "Hal" for an automobile CPS 180, while a second user may use the wakeword "Carja" for the automobile CPS 180. In another example, the first user may access Hal using a tap-to-talk gesture while the second user may access Carja using a press-and-hold gesture.

The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. For example, each user profile may include a list of assistants enabled for the user with respect to a given device. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 3:
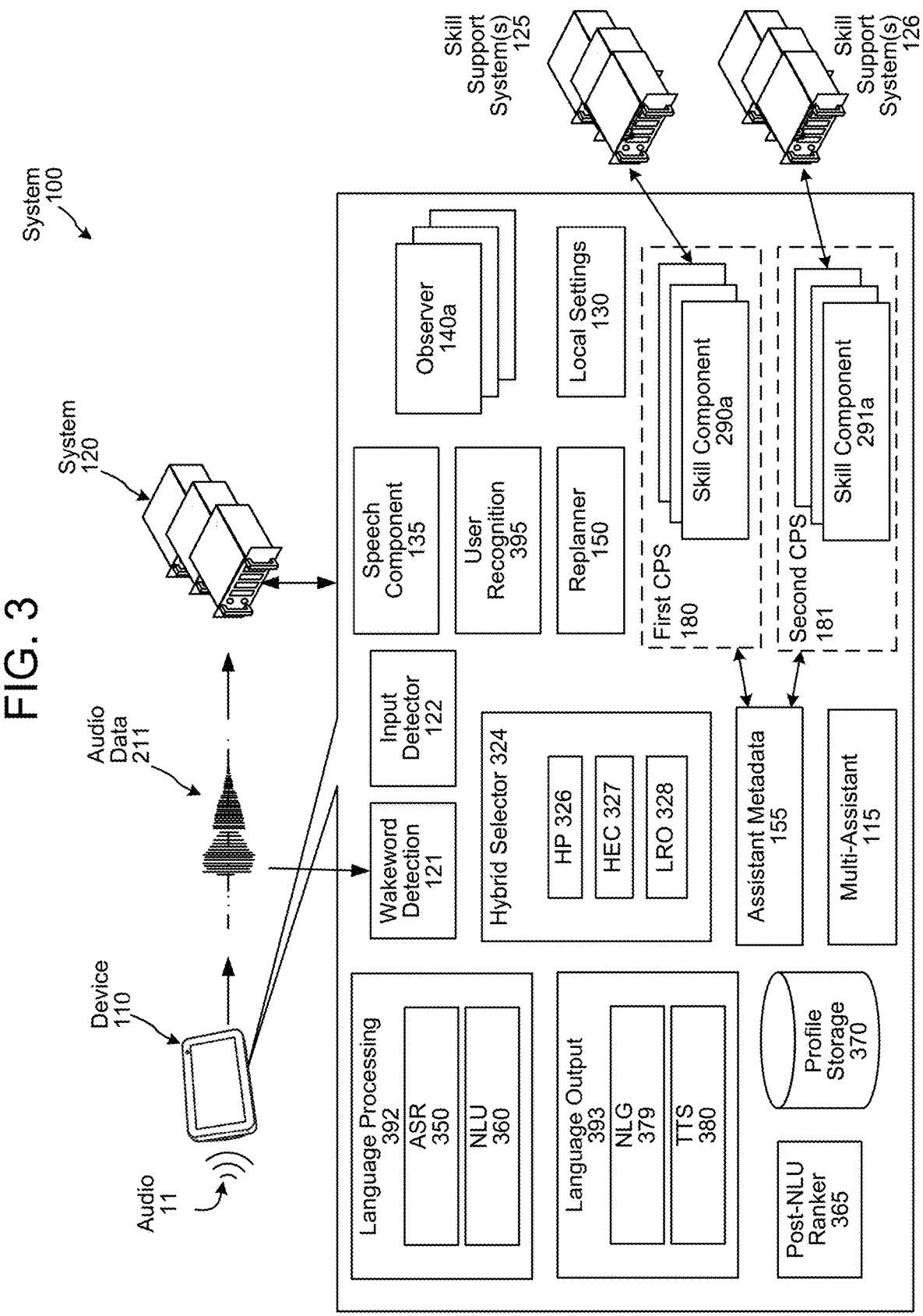
FIG. 3 is a conceptual diagram illustrating components that may be included in a device of the virtual assistant system, according to embodiments of the present disclosure.

Although the components of FIG. 2 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 121 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 121. If the wakeword detection component 121 detects a wakeword in the audio data 211, the wakeword detection component 121 may send an indication of such detection to the hybrid selector 324. In response to receiving the indication, the hybrid selector 324 may send the audio data 211 to the system 120 and/or the ASR component 350. The wakeword detection component 121 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the system 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system 120 (which may operate similarly to skill components 290). The language processing components 392 may provide NLU output data and/or metadata related to the input audio data as inputs to a CPS 180 or 181. A CPS 180 or 181 may be associated with one or more skill components 290 or 291. The device 110 may also internally include, or otherwise have access to, other components such as a user recognition component 395 (configured to process in a similar manner to that discussed herein with respect to the user recognition component 295 of the system 120), profile storage 370 (configured to store similar profile data to that discussed herein with respect to the profile storage 270 of the system 120), or other components. In at least some embodiments, the profile storage 370 may only store profile data for a user or group of users specifically associated with the device 110. Similar to as described above with respect to skill component 290, a skill component 390 may communicate with a skill system(s) 125. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 380.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the system 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 121 may result in sending audio data to certain language processing components 392/skills 390 for processing while detection of the wakeword "Computer" by the wakeword detector 121 may result in sending audio data different language processing components 392/skills 390 for processing.

Figure 4:
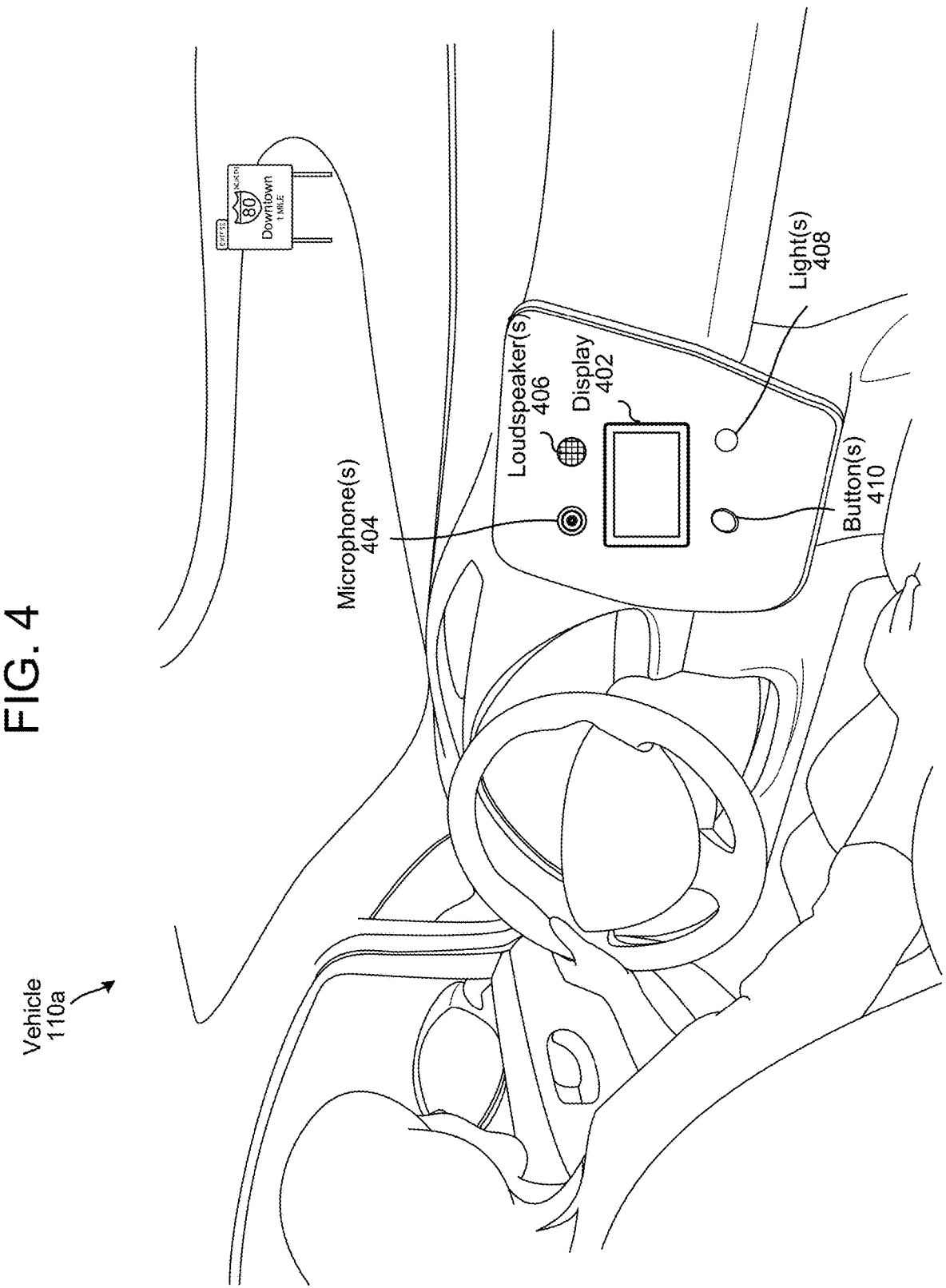
FIG. 4 illustrates a vehicle-based user interface according to embodiments of the present disclosure.

FIG. 4 illustrates a vehicle-based user interface according to embodiments of the present disclosure. FIG. 4 illustrates an interior of the vehicle 110a. The vehicle 110a may include, on a dashboard, steering wheel, heads-up display, or other interior surface or feature, such as a display 402, which may be a touchscreen display. The vehicle 110a may further include one or more microphones 404, which may be used to receive audio that includes an utterance and generate corresponding input audio data. One or more loudspeakers 406 may be used to output audio corresponding to output audio data, which may be received from the system 120. One or more lights 408 may be used to display information; in some embodiments, the lights 408 are used to identify a speech processing system being used to provide output audio and/or perform a task. For example, one light 408 may be illuminated when a first speech processing system is being used to output audio and/or perform an action, and a second light 408 may be illuminated when a second speech processing system is being used. In another example, a light 408 is illuminated using a first color (e.g., blue) when a first speech processing system is being used, and same light 408 is illuminated using a second color (e.g., green) when a second speech processing system is being used. The vehicle 110a may further include one or more buttons 410, dials, switches, triggers, or other such user-input devices. In some embodiments, when the vehicle 110a detects activation of a button 410 and/or touching of the display 402, the microphone 404 captures audio, and the vehicle 110 sends corresponding audio data to the system 120. The vehicle 110a may invoke different assistants depending on the manner of button activation; for example, a tap-to-talk may invoke a first CPS 180 and a press-and-hold may invoke a second CPS 181. In other embodiments, the vehicle 110*a* continually receives audio data captured by the microphone 404 and sends corresponding audio data to the system 120 when the vehicle 110*a* detects a wakeword in the audio data (as described in greater detail below).

Figure 5:
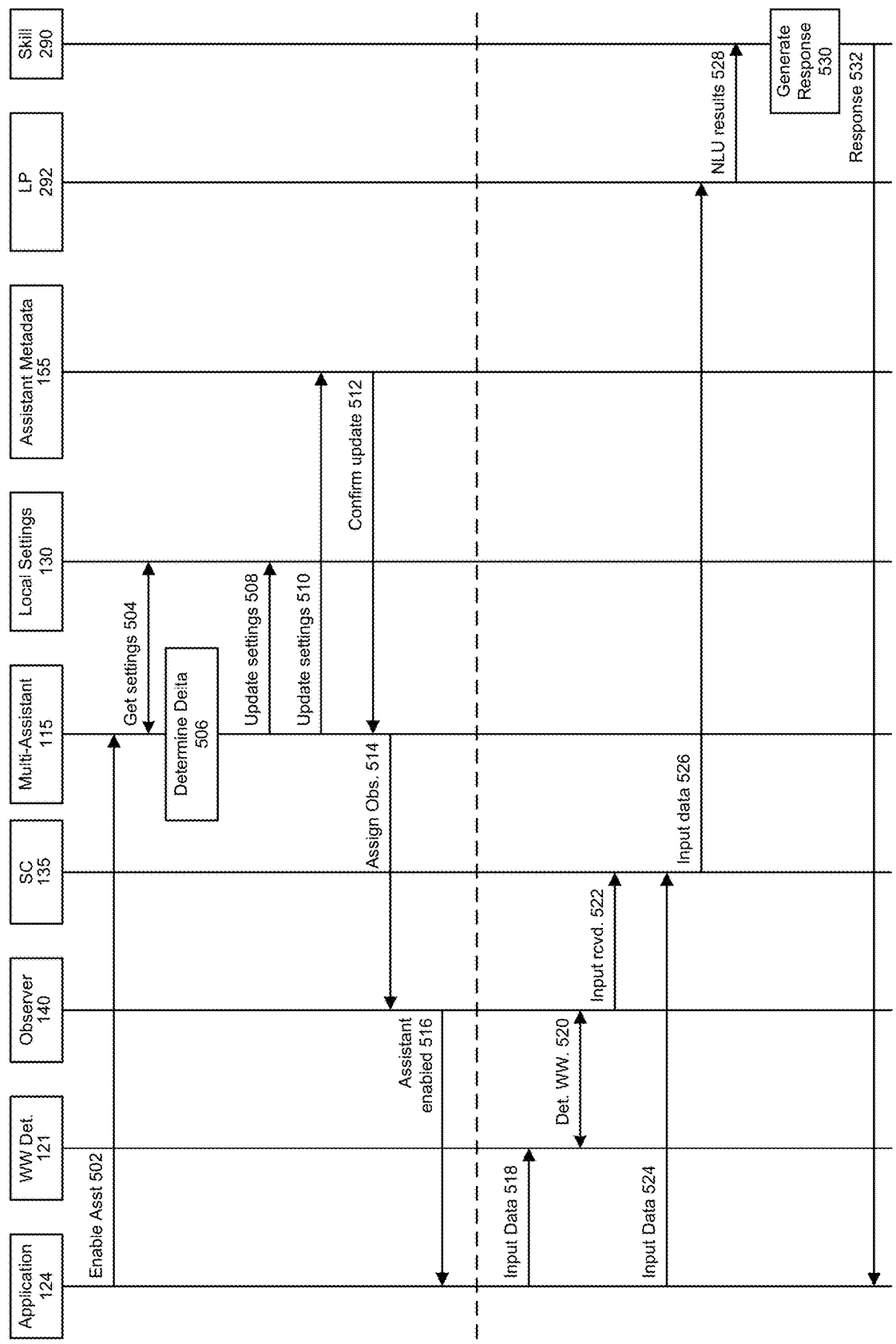
FIG. 5 is a signal flow diagram illustrating example operations for enabling a new virtual assistant in the virtual assistant system, according to embodiments of the present disclosure.

FIG. 5 is a signal flow diagram illustrating example operations for enabling a new virtual assistant in the virtual assistant system, according to embodiments of the present disclosure. FIG. 5 describes operations between the application 124, wakeword detector 121, observer component 140, speech component 135, multi-assistant component 115, local settings 130, assistant metadata component 155, language processing component 292, and skill 290. In some implementations, the application 124, wakeword detector 121, observer component 140, multi-assistant component 115, and/or local settings 130 may reside on a device 110. In some implementations, the assistant metadata component 155, language processing component 292, and skill 290 may reside on one or more remote systems 120.

The application 124 can receive a request from a user to enable an assistant (e.g., a command processing subsystem (CPS) 180) for use with the speech-processing system. The application 124 can send (502) the request to enable the assistant—that is, a CPS—to the multi-assistant component 115. The multi-assistant component 115 may retrieve (504) current settings for the device 110 from the local settings 130. The multi-assistant component 115 may distil (506) the data to determine a change in the local settings 130 in light of the request. The multi-assistant component 115 may update (508) the local settings 130 based on the change. The multi-assistant component 115 may update (510) the settings of the assistant metadata component 155 on the remote system 120 based on the change as well. The assistant metadata component 155 may confirm (512) the update by returning response data to the multi-assistant component 115. The multi-assistant component 115, after receiving the response data, may assign (514) an observer component 140 for the enabled assistant. The observer component 140 may monitor the application 124, the wakeword detector 121 and/or input detector 122 and detect an invocation of the CPS 180 by the user. The multi-assistant component 115 may configure a different observer component 140 for each enabled assistant. The observer component 140 may send (516) an indication to the application 124 that the settings have been updated and the assistant has been enabled. The observer component 140 may then monitor for invocations of the assistant.

In various implementations, one or more assistants may be enabled by a user and/or "at the factory" prior to sale of the device 110. A device 110 may have one, two, or many assistants enabled for it at a given time. In some implementations, assistants may be added or removed dynamically by the user. With an assistant enabled, the device 110 and system 120 may execute commands on behalf of the user with the corresponding CPS 180/181. In an example operation, the user may provide an input to the application 124, and a wakeword detector 121 may detect (518) a wakeword in the input data. In some cases, an input detector 122 may detect a gesture associated with a CPS 180. In some implementations, the observer component 140 may be configured to monitor (520) for invocations of the CPS 180 via the application 124, the wakeword detector 121 and/or input detector 122. Upon detecting a wake command for the CPS 180, in this case the wake word associated with the CPS 180, the observer component 140 may notify (522) the speech component 135. In some implementations, the device 110 may output an audio or visual indication that the invoked CPS 180 has been activated. The indication may also represent a status of the CPS 180, such as "listening," "thinking," etc. The speech component 135 may then receive (524) the input data from the application 124 and send (526) data representing the input to the remote system 120. A language processing (LP) component 292 of the system may receive the data and perform language processing operations including ASR, NLU, and/or entity recognition. The LP component 292 may provide (528) the NLU results data to the skill 290 for execution. The skill 290 may be a skill associated with the invoked CPS 180 or a skill shared among multiple CPSs 180/181. The skill 290 can generate (530) response data responsive to the command. The response data may include a representation of a verbal response for output to the user as synthesized speech. The response data may additionally or alternatively include an instruction for performance of an operation by another component of the system; for example, an instruction to the application 124 to actuate a feature of the device 110, such as the windows of a vehicle 110*a*. The skill 290 may send (532) the response data to the application 124 for appropriate handling as an output, etc. The response data may indicate an action to be performed by the device 110; for example, by actuating a mechanical device like rolling up a car window, but outputting media such as streamlining music, and/or outputting synthesizes speech such as an answer to a question.

Figure 6:
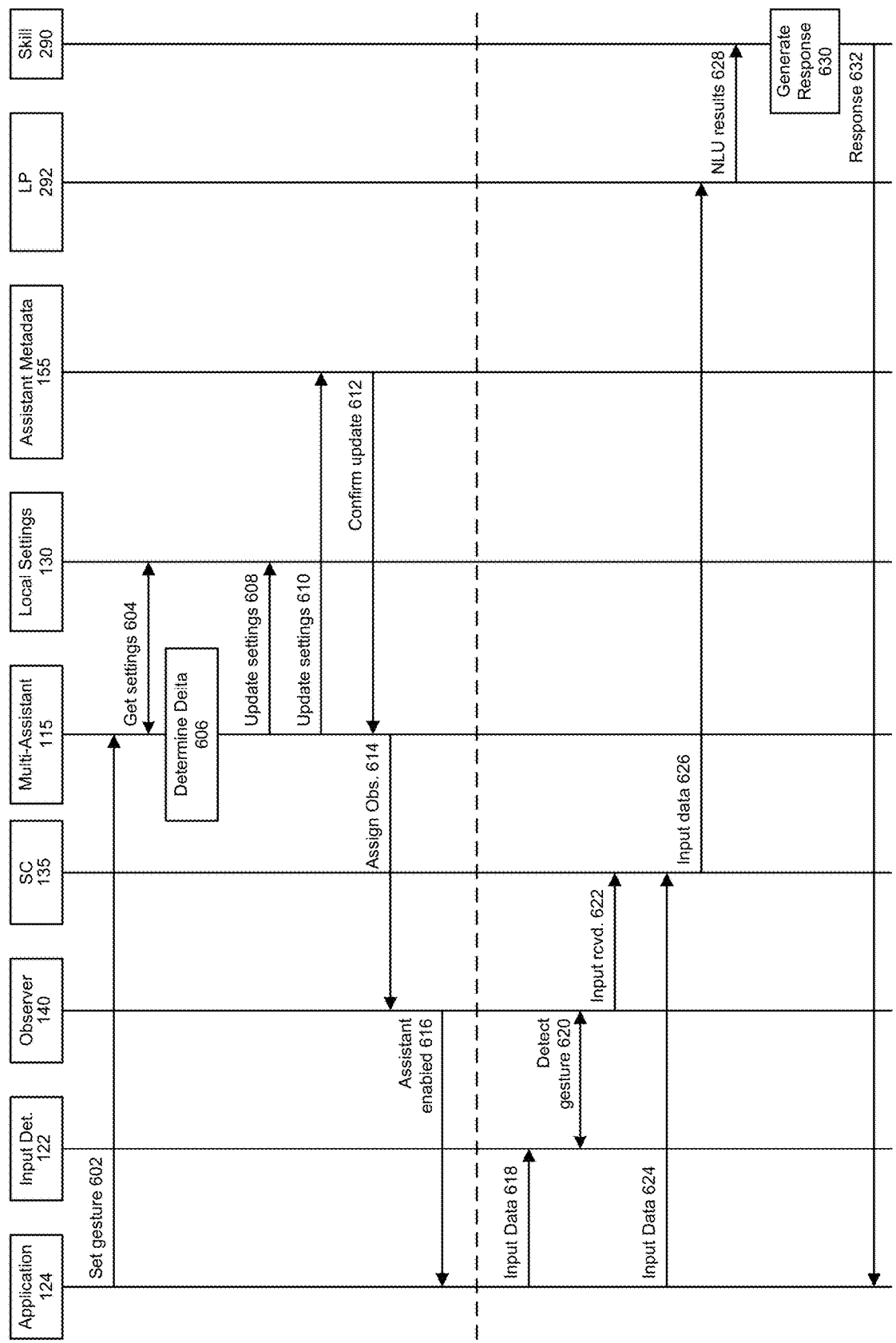
FIG. 6 is a signal flow diagram further illustrating example operations for assigning a gesture for invoking a virtual assistant in the virtual assistant system, according to embodiments of the present disclosure.

FIG. 6 is a signal flow diagram further illustrating example operations for assigning a gesture for invoking a virtual assistant in the virtual assistant system, according to embodiments of the present disclosure. FIG. 6 describes operations between the application 124, input detector 122, observer component 140, speech component 135, multi-assistant component 115, local settings 130, assistant metadata component 155, language processing component 292, and skill 290.

The application 124 can receive a request from a user to enable an assistant (e.g., a CPS 180) for use with the speech-processing system. The application 124 can send (602) the request to assign a gesture to the assistant to the multi-assistant component 115. The gesture may be a non-verbal movement detectable by the device 110, such a tap or press-and-hold of a button of the device 110. In some implementations, the gesture may be a movement detectable by a touchscreen, camera, dial, and/or other input mechanism of the device 110. The multi-assistant component 115 may retrieve (604) current settings for the device 110 from the local settings 130. The multi-assistant component 115 may distil (606) the data to determine a change in the local settings 130 in light of the request. The multi-assistant component 115 may update (608) the local settings 130 based on the change. The multi-assistant component 115 may send (610) an update of the settings to the assistant metadata component 155 on the remote system 120. The assistant metadata component 155 may confirm (612) the update by returning response data to the multi-assistant component 115. The multi-assistant component 115, after receiving the response data, may assign (614) an observer component 140 for the enabled assistant. The observer component 140 may monitor the input detector 122 and detect the gesture assigned to the CPS. The multi-assistant component 115 may configure a different observer component 140 for each enabled assistant. The observer component 140 may send (616) an indication to the application 124 that the settings have been updated and the requested gesture has been assigned for invoking the assistant. The observer component 140 may then monitor for invocations of the assistant via the assigned gesture.

With the gesture set for invoking the corresponding assistant assigned, the device 110 and system 120 may execute commands on behalf of the user with the corresponding CPS 180/181 based on a detection of the assigned gesture. In an example operation, the user may provide an input to the application 124, and the input detector 122 may detect (618) that the application 124 received the gesture. In some implementations, the observer component 140 may be configured to monitor (620) for invocations of the CPS 180 via the application 124, the wakeword detector 121 and/or input detector 122. Upon detecting a wake command for the CPS 180, in this the gesture associated with the CPS 180, the observer component 140 may notify (622) the speech component 135. In some implementations, the device 110 may output an audio or visual indication that the invoked CPS 180 has been activated. The indication may also represent a status of the CPS 180, such as "listening," "thinking," etc. The speech component 135 may then receive (624) the input data from the application 124 and send (626) data representing the input to the remote system 120. The LP component 292 may receive the data and perform language processing operations including ASR, NLU, and/or entity recognition. The LP component 292 may provide (628) the NLU results data to the skill 290 for execution. The skill 290 may generate (630) response data responsive to the command. The response data may include a representation of a verbal response for output to the user as synthesized speech. The response data may additionally or alternatively include an instruction for performance of an operation by another component of the system; for example, an instruction to the application 124 to actuate a feature of the device 110, such as the interior lights of a vehicle 110a. The skill 290 may send (632) the response data to the application 124 for appropriate handling as an output, etc. The response data may indicate an action to be performed by the device 110; for example, by actuating a mechanical device like rolling up a car window, but outputting media such as streamlining music, and/or outputting synthesizes speech such as an answer to a question.

Figure 7A:
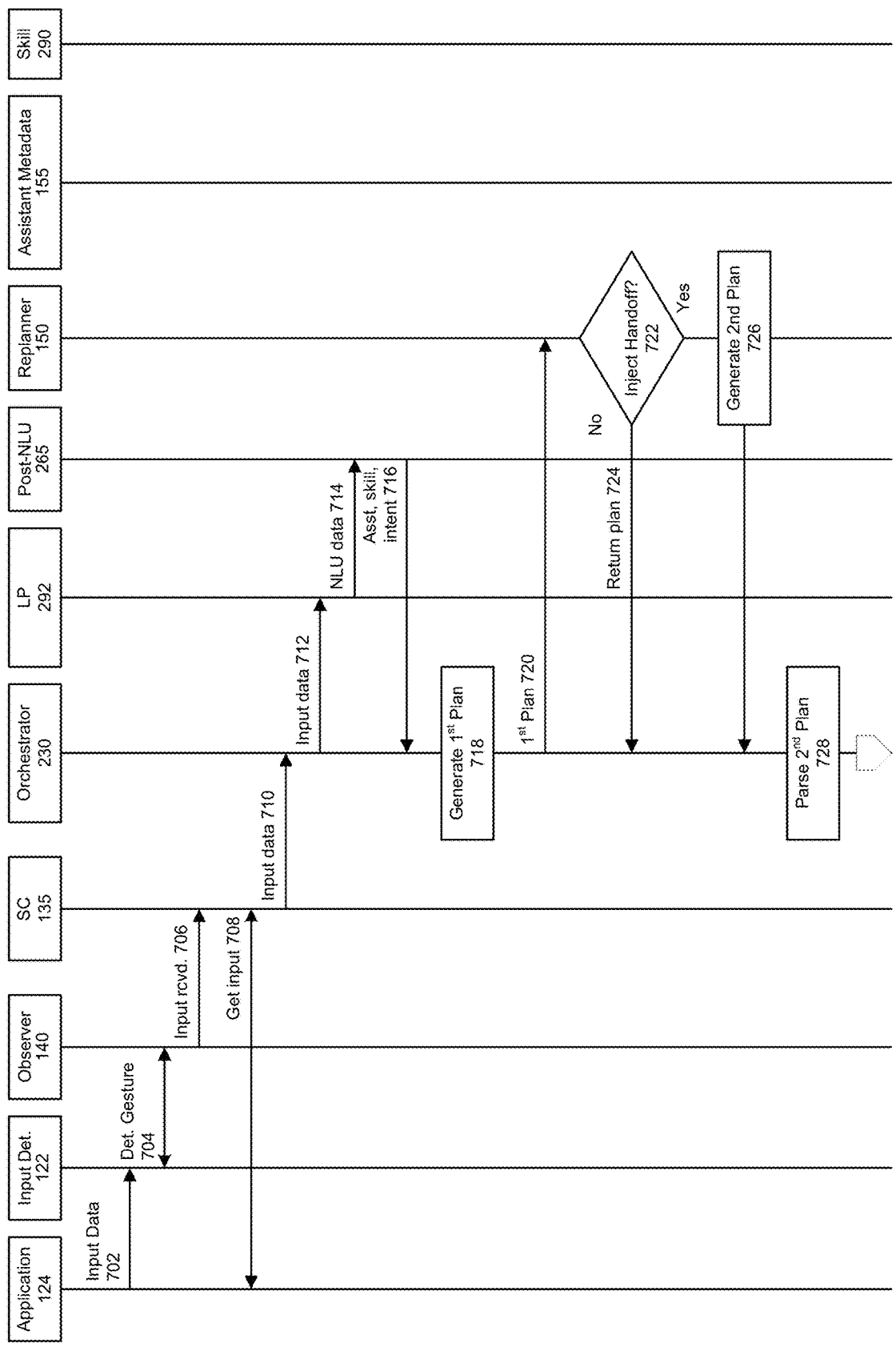

FIGS. 7A and 7B are signal flow diagrams illustrating example operations for handling a command by performing a handoff to an assistant different from the assistant requested for handling the command, according to embodiments of the present disclosure. FIGS. 7A and 7B describes operations between the application 124, input detector 122, observer component 140, speech component 135, orchestrator component 230, language processing component 292, post-NLU ranker 265, replanner component 150, assistant metadata component 155, and skill 290. In some implementations, the application 124, input detector 122, observer component 140, and/or speech component 135 may reside on a device 110. In some implementations, orchestrator component 230, language processing component 292, post-NLU ranker 265, replanner component 150, assistant metadata component 155, and/or skill 290 may reside on one or more remote systems 120.

The application 124 can receive an invocation of a first CPS 180; in some cases, based on detection of a wakeword and/or a gesture associated with the first CPS 180. As shown in FIG. 7A, the input detector 122 may detect (702) the gesture in the input data. An observer component 140 associated with the first CPS 180 may monitor (704) for a wake command associated with the first CPS 180. Upon detecting the wake command, in this case the gesture associated with the first CPS 180, the observer component 140 may notify (706) the speech component 135 that the first CPS 180 has been invoked. The speech component 135 may receive (708) the input data and provide (710) an indication of the input data to the remote device 120. In some implementations, the indication of the input data may include audio data, ASR data, and/or NLU data.

The orchestrator component 230 may receive the data and forward (712) it to the LP component 292 for processing. The LP component 292 may perform various language/speech processing functions such as ASR, NLU, and/or entity resolution. The LP component 292 may send (714) NLU result data to the post-NLU ranker 265. In some implementations, the LP component 292 may perform one or more language processing operations based on data specific to CPSs 180/181 enabled for use on the device 110 and/or available for use on the device 110. The NLU result data may include one or more NLU hypotheses. An NLU hypothesis may identify a skill, intent, and/or slot text corresponding to the input data. The post-NLU ranker 265 may filter and rerank the NLU result data based on the available CPSs 180/181 and their associated skills. In the example operations shown in FIGS. 7A and 7B, the post-NLU ranker 265 may determine that the skill indicated by a highest ranked NLU hypothesis is not associated with the requested (first) CPS 180. The post-NLU ranker 265 may return (716) a result or a ranked list of results in the form of combinations of a CPS, a skill, and an intent.

The orchestrator component 230 may, based on the results returned from the post-NLU ranker 265, generate (718) first plan data for executing the requested command. The plan data represents one or more operations for handling the command as well as additional information for each operation including which CPS 180/181 an operation may be associated with. The orchestrator component 230 may send (720) the first plan data to the replanner component 150 for processing. Based on the first plan data, the replanner component 150 may determine (722) whether or not to inject handoff operations into the first plan data. For example, the replanner component 150 may determine whether the requested assistant matches the CPS 180/181 indicated by the result returned by the post-NLU ranker 265. In some cases, the replanner component 150 may determine that no modification of the first plan data is necessary—for example, due to determining a match between the requested assistant and the CPS selected for handling the command—and return (724) the first plan data to the orchestrator component 230. In other cases, the replanner component 150 may determine a mismatch between the requested assistant and the CPS 180/181 indicated by the result returned by the post-NLU ranker 265. The latter cases, the replanner component 150 may generate (726) second plan data that may include one or more additional handoff-related operations in addition to an operation indicated by the first plan data. The replanner component 150 may return the second plan data to the orchestrator component 230. The orchestrator component 230 may receive the second plan data and parse (728) it to perform the prescribed operations.

Continuing to FIG. 7B, a first operation specified in the plan data may indicate launching (730) the replanner component 150 to perform a first operation. For example, the operation may involve the replanner component 150 generating (732) a message based on settings related to one of the CPSs 180/181. The message may be synthesized speech for output by the device. The synthesized speech may be in a speech style associated with one of the CPSs 180/181; e.g., to indicate to the user which CPS 180/181 is generating the message. In the example of FIG. 7B, the replanner component 150 may generate a message consistent with a standard handoff in which the requested assistant notifies the user that a second assistant may handle the command. (Different types of handoffs are described below with references to FIGS. 11A through 11C.) For example, if the requested assistant is Alexa, but Hal is selected to execute the command, the message may be output in Alexa's voice: "Hm. Hal?" The replanner component 150 may return the message to the orchestrator component 230. The orchestrator component 230 may send (734) the message to the application 124 for output by the device. The replanner component 150 and/or the orchestrator component 230 may call on a TTS component for generating the synthesized speech. The TTS component may synthesize the speech based on parameters associated with the requested assistant as stored by the assistant metadata component 155.

After outputting the message, the orchestrator component 230 may continue parsing the plan and perform additional operations. For example, the plan may specify an operation for sending a directive to the application 124 that changes the active assistant. The orchestrator component 230 may launch (736) a second time with a payload that indicates that the active assistant for the device 110 is to change. The replanner component 150 may generate (738) the directive and return it to the orchestrator component 230. The orchestrator component 230 may output (740) the directive to the application 124. The application 124, upon receiving the directive, may update its state to reflect the active assistant for the purpose of maintaining an active dialog with the active assistant (that is, the active CPS 180 or 181). The application 124 may additionally provide indications of the active assistant in the form of sounds (earcons), displayed images (voice chromes), and or light color/patterns emitted from LEDs or other light sources of the device 110.

After outputting the message and directive to the application 124, the orchestrator component 230 may call (742) the skill 290 to execute the command. The skill 290 may be a skill associated with the second CPS 181. The skill 290 may generate (744) a response and return it to the orchestrator component 230 in the form of result data. The result data may be in the form of a message—e.g., verbal message—or may specify some other operation to be performed; for example, an operation affecting streaming media, a mechanism of a vehicle 110a, etc. For a response in the form of a verbal message, the orchestrator component 230 (or the skill 290) may call on a TTS component to generate synthesized speech in a speech style associated with the second CPS 181 based on speech/voice parameters provided by the assistant metadata component 155. The orchestrator component 230 may send (746) the response to the application 124 for output by the device 110.

Figure 8B:
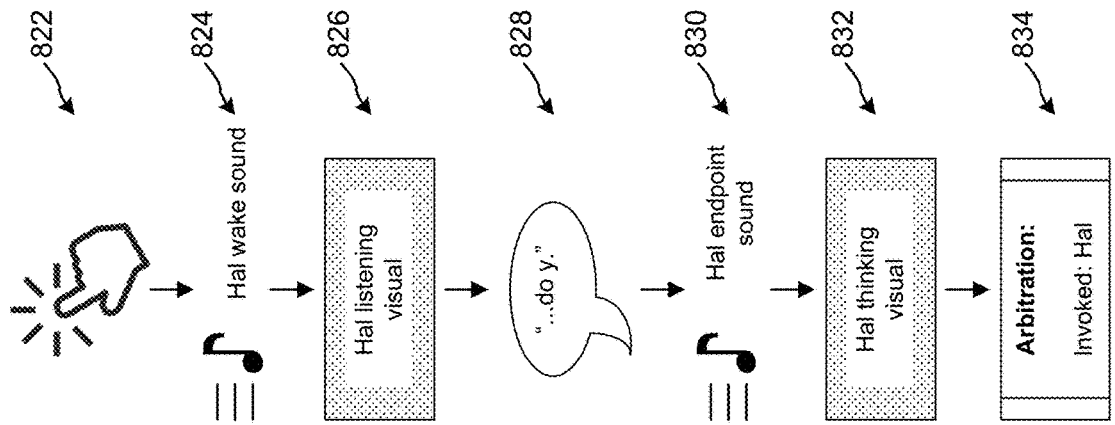
FIGS. 8A and 8B illustrate example inputs and outputs of a user interface in the virtual assistant system, according to embodiments of the present disclosure.
Figure 8A:
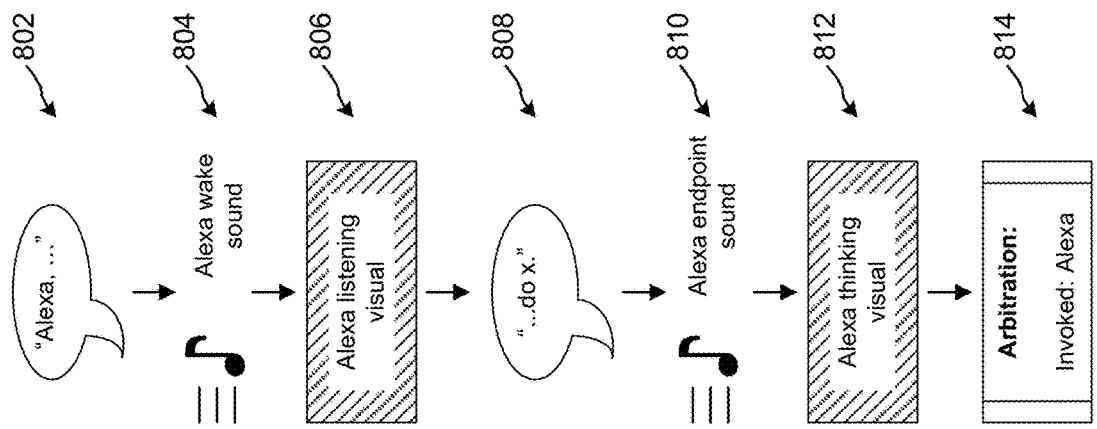

FIGS. 8A and 8B illustrate example inputs and outputs of a user interface in the virtual assistant system, according to embodiments of the present disclosure. In FIG. 8A, a user may invoke (802) the first CPS 180 with a wake command associated with the first CPS 180; in this case, by speaking the wake word "Alexa." An observer component of the device 110 may monitor a wakeword detector of the device 110 for invocation of the assistant for which the observer component is configured to monitor. A multi-assistant component of the device 110 may provide the audio and visual outputs indicative of the assistants and their status. The device 110 may, upon detecting the wakeword for Alexa, may output (804) an Alexa wake sound indicating to the user that Alexa has been successfully invoked to receive a command. The device 110 may also present (806) a visual theme further indicating that Alexa has been invoked and awaits a command. The visual theme may include illuminating a light with a certain color and/or light pattern. The visual theme may include presenting a still or animated image on a display of the device 110. The user may subsequently provide (808) a command, "Do x." The device 110 may respond by outputting (810) an Alexa endpoint sound indicating that the command was received. The device may present (812) a visual theme indicating that Alexa is "thinking"; e.g., processing the command. The system may then process (814) the command using a first CPS 180 corresponding to the Alexa assistant by, for example, the multi-assistant component sending data representing the command to the remote system 120 for processing by the invoked CPS 180.

In FIG. 8B, a user may invoke (822) the second CPS 181 using a wake command in the form of a gesture associated with the second CPS 181, where the gesture is a non-verbal movement detectable by the device 110. In this case, the gesture may be a button press and the associated assistant may be Hal. An observer component of the device 110 may monitor an input detector of the device 110 for invocation of the assistant for which the observer component is configured to monitor. The device 110 may, upon detecting the gesture for Hal, output (824) a Hal wake sound indicating to the user that Hal has been successfully invoked to receive a command. The device 110 may also present (826) a visual theme further indicating that Hal has been invoked and awaits a command. The user may subsequently provide (828) a command, "Do y." The device 110 may respond by outputting (830) a Hal endpoint sound indicating that the command was received. The device may present (832) a visual theme indicating that Hal is "thinking"; e.g., processing the command. The system may then process (834) the command using a second CPS 181 corresponding to the Hal assistant.

Figure 9:
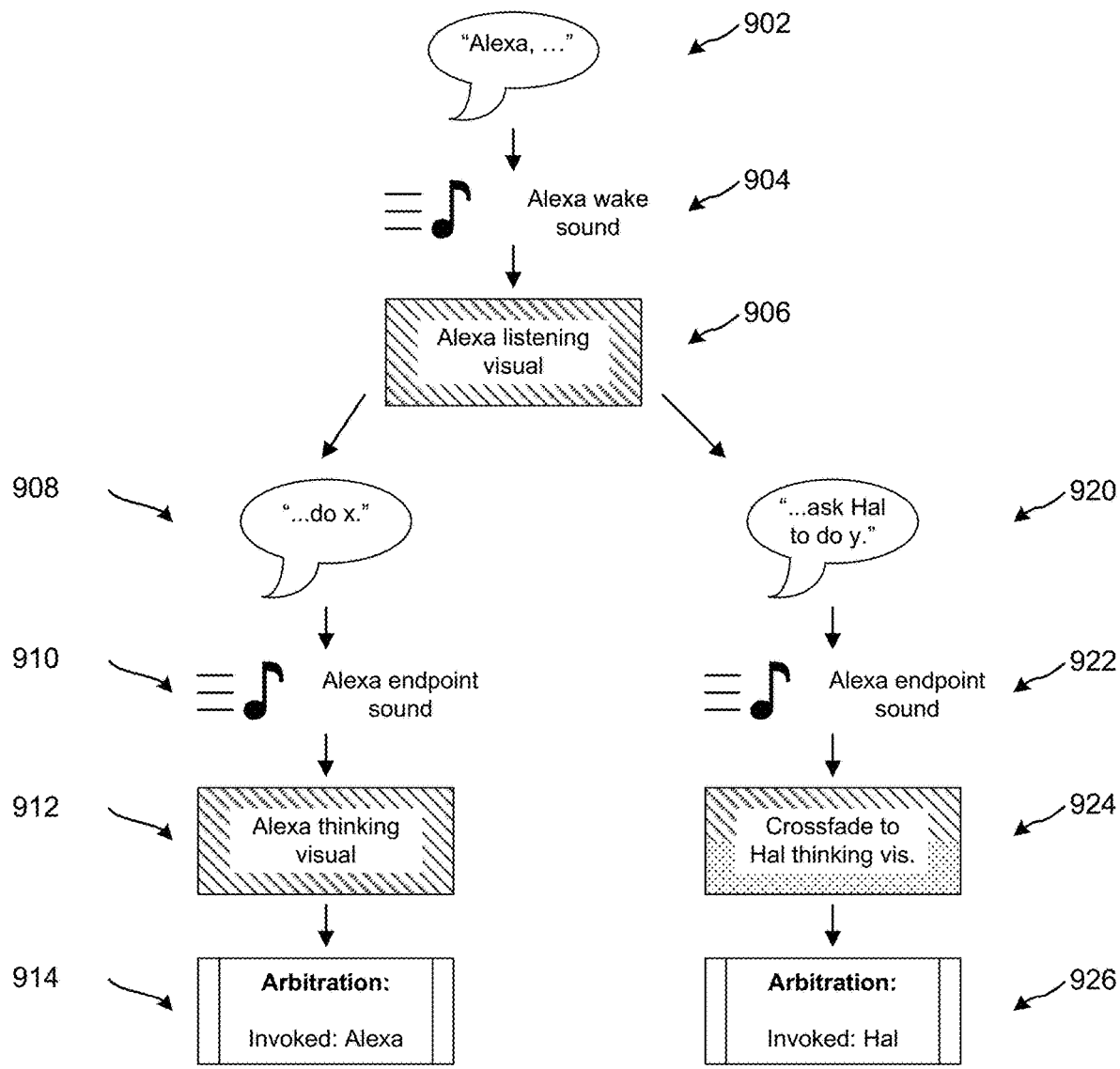
FIG. 9 illustrates example inputs and outputs of a user interface in the virtual assistant system when wakewords for multiple assistants are detected, according to embodiments of the present disclosure.

FIG. 9 illustrates example inputs and outputs of a user interface in the virtual assistant system when wakewords for multiple assistants are detected, according to embodiments of the present disclosure. For example, the user may say (902) "Alexa." The device 110, upon detecting the wakeword, may output (904) the Alexa wake sound, and may present (906) the Alexa listening visual, to indicate to the user that the Alexa assistant has been invoked and is awaiting a command. In some cases, the user may speak (908) a command, "Do x." The device 110 may output (910) the Alexa endpoint sound and present (912) the Alexa thinking visual. The first CPS 180 corresponding to Alexa may handle (914) the command.

In some situations, however, a user may wake a device 110 with a wakeword associated with a first assistant, but subsequently give a command naming a second assistant. For example, after saying "Alexa," the user may say (920) "ask Hal to do y." The device may then output (922) the Alexa endpoint sound. But instead of presenting the Alexa thinking visual, the device 110 may crossfade (924) from the Alexa listening visual to the Hal thinking visual. The second CPS 181 corresponding to Hal will handle (926) the command.

Figure 10:
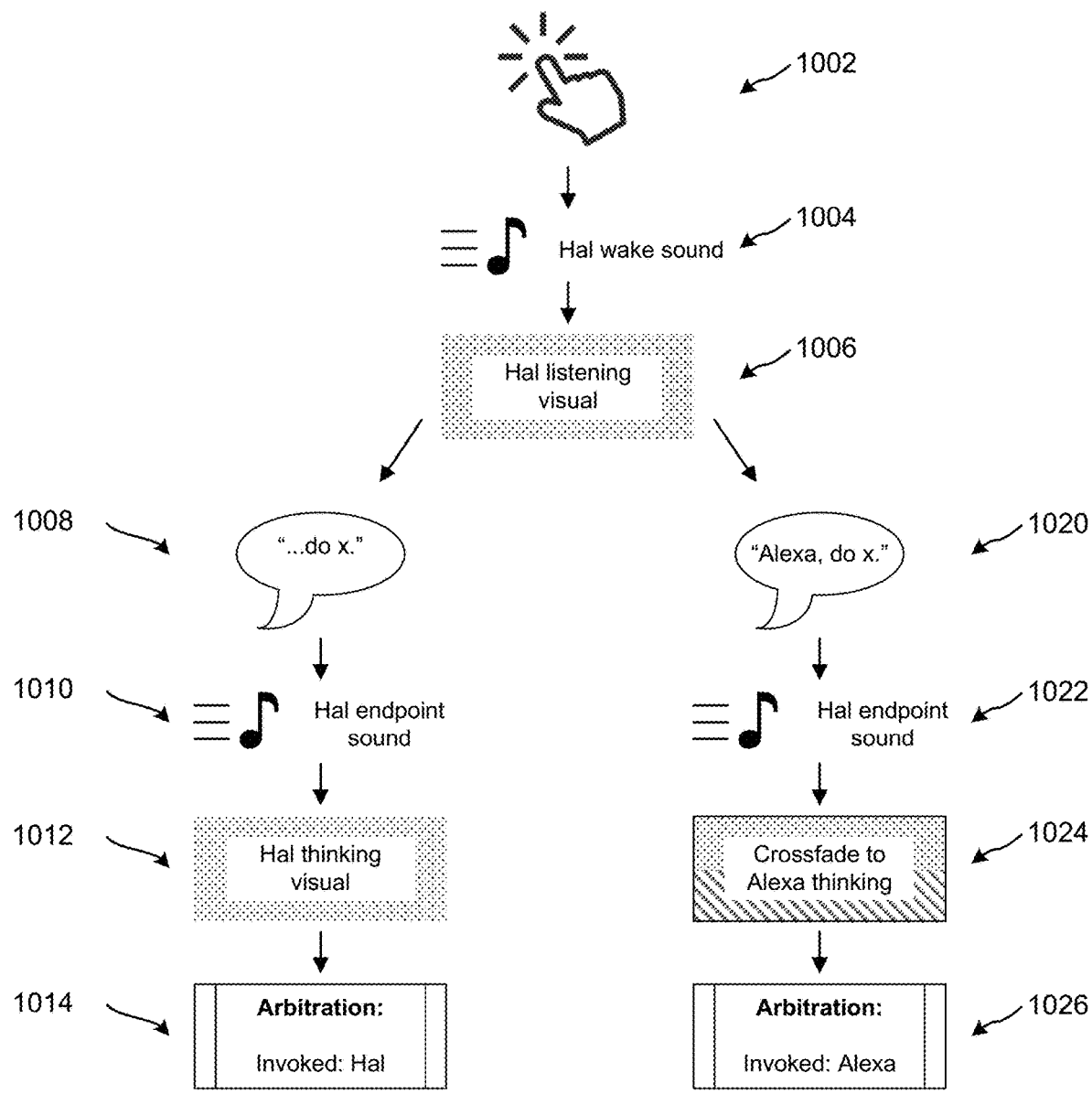
FIG. 10 illustrates example inputs and outputs of a user interface in the virtual assistant system when a wakeword of a first assistant is detected following a gesture associated with a second assistant, according to embodiments of the present disclosure.

FIG. 10 illustrates example inputs and outputs of a user interface in the virtual assistant system when a wakeword of a first assistant is detected following a gesture associated with a second assistant, according to embodiments of the present disclosure. For example, in some cases a button and/or a gesture may be associated with a default assistant. Indication of a default assistant may correspond to a "soft" signal indicating the user's desire to request that particular assistant. For example, the default assistant may be Hal. The user may invoke the default assistant with the gesture (1002). The device 110, upon detecting the gesture, may output (1004) the Hal wake sound, and may present (1006) the Hal listening visual, to indicate to the user that the Hal assistant has been invoked and is awaiting a command. In some cases, the user may speak (1008) a command, "Do x." Thus, the device will continue processing the command as Hal. The device 110 may output (1010) the Hal endpoint sound and present (1012) the Hal thinking visual. The second CPS 181 corresponding to Hal may handle (1014) the command.

In some situations, however, the user may subsequently give a command naming a second assistant. For example, after using the gesture for the default assistant Hal, the user may say (1020) "Alexa, to do y." The device may then output (1022) the Hal endpoint sound. But instead of presenting the Hal thinking visual, the device 110 may crossfade (1024) from the Hal listening visual to the Alexa thinking visual. The first CPS 180 corresponding to Alexa may handle (1026) the command.

Figure 11A:
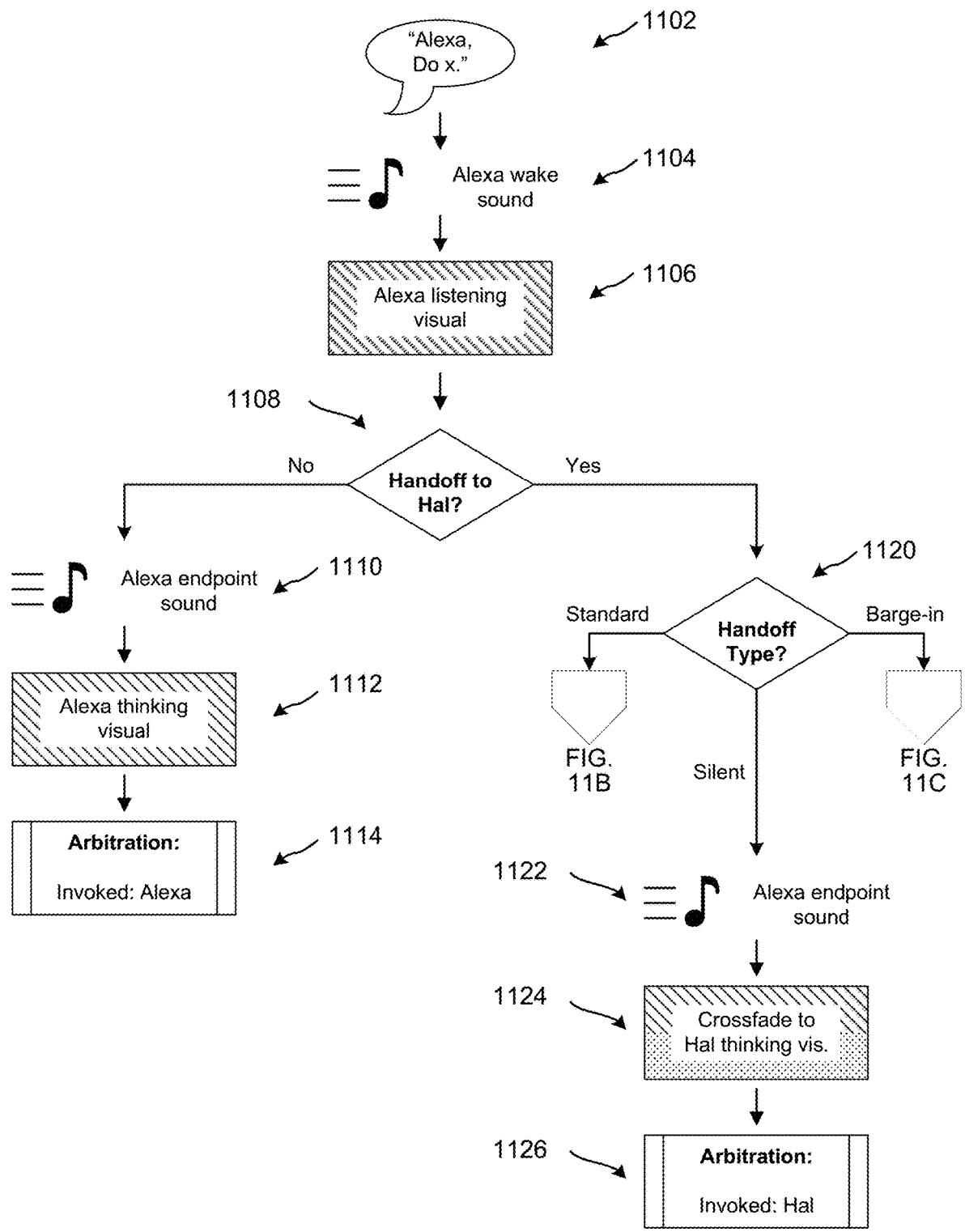
FIGS. 11A through 11C illustrate example inputs and outputs of a user interface in the virtual assistant system for different types of handoffs from a first assistant to a second assistant, according to embodiments of the present disclosure.
Figures 11B, 11C:
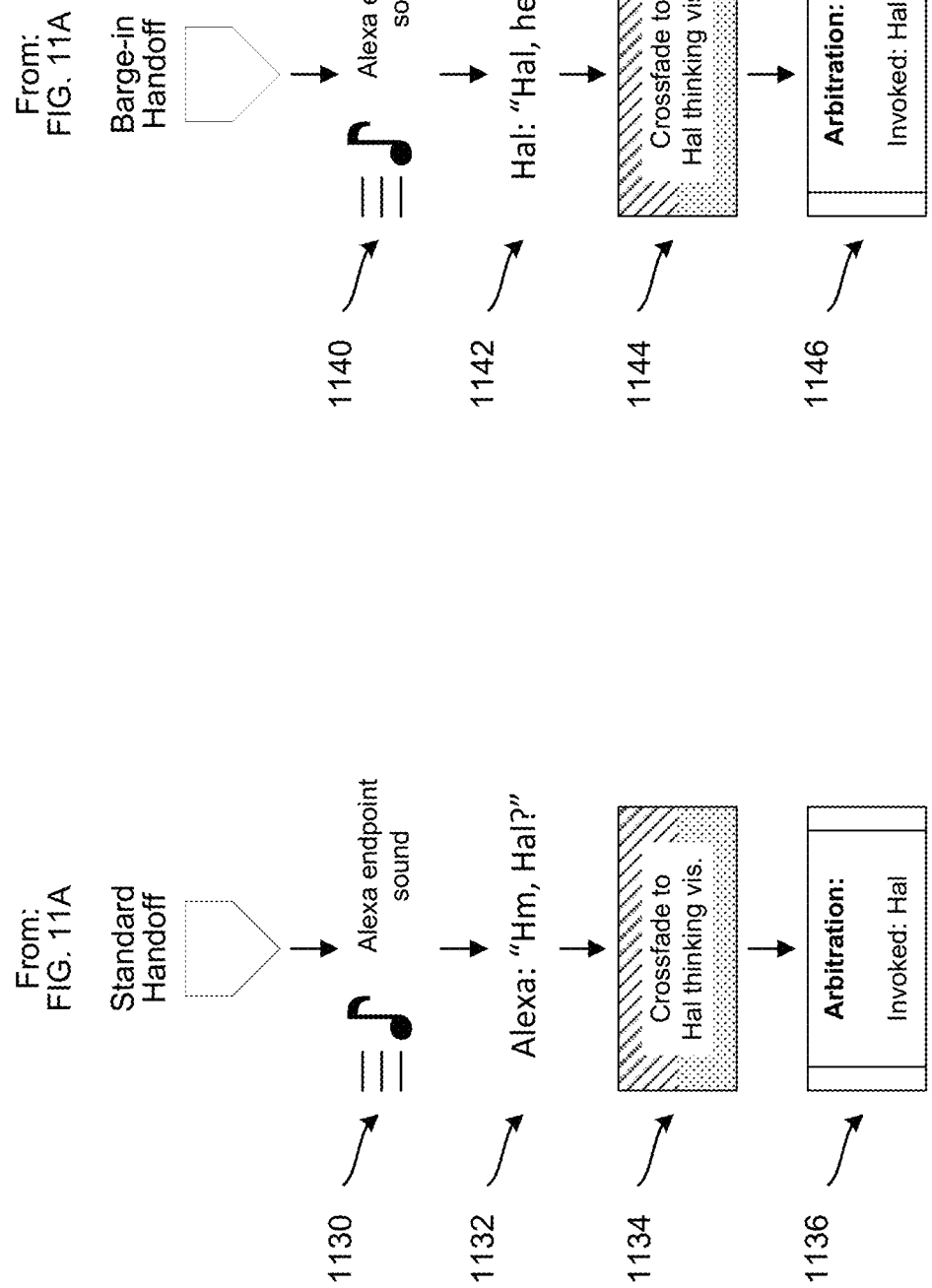

FIGS. 11A through 11C illustrate example inputs and outputs of a user interface in the virtual assistant system for different types of handoffs from a first assistant to a second assistant, according to embodiments of the present disclosure. In FIG. 11A, a user may invoke (1102) the first CPS 180 based on an associated wakeword for the first CPS 180; in this case, "Alexa, do x." An observer component of the device may detect the invocation of the assistant for which the observer component is configured to monitor, and a multi-assistant component of the device 110 may provide the audio and visual outputs indicative of the assistants and their status. The device 110 may, upon detecting the wakeword for Alexa, output (1104) an Alexa wake sound indicating to the user that Alexa has been successfully invoked to receive a command. The device 110 may also present (1106) a visual theme further indicating that Alexa is "listening." The visual theme may include illuminating a light with a certain color and/or light pattern. The visual theme may include presenting a still or animated image on a display of the device 110. The device 110 may send the command to the remote system 120 for processing.

The system 120 may determine (1108), using processes previously described, whether to handoff the command to a different CPS corresponding to an assistant other than the one requested by the user. If the system 120 determines that no handoff is necessary, ("No" at 1108), the device 110 may output (1110) an Alexa endpoint sound indicating that the command was received. The device may present (1112) a visual theme indicating that Alexa is "thinking"; e.g., processing the command. The system may then process (1114) the command using the first CPS 180 corresponding to the Alexa assistant and return a response.

If the system 120 determines that a handoff is necessary, ("Yes" at 1108), the system 120 may send a notification to the multi-assistant component with an indication of the selected assistant; in this case, the second CPS 181. The notification may indicate different operations depending on what type of handoff (decision block 1120) is to be performed. FIGS. 11A through 11C describe examples of three different handoff types. Steps 1122 through 1126 indicate operations for a silent handoff, the steps on FIG. 11B indicate operations for a standard handoff, and the steps in FIG. 11C indicate operations for a barge-in type handoff. Other handoff types, including handoffs including more or fewer steps may be performed without departing from the scope of this disclosure. For example, some handoffs may include outputs from (or associated with) both CPSs 180/ 181 or no outputs at all; for example, if the command is dead ended.

In a silent handoff, the device 110 may output (1122) the Alexa endpoint sound. But instead of presenting the Alexa thinking visual, the device 110 may crossfade (1124) from the Alexa listening visual to the Hal thinking visual. The second CPS 181 corresponding to Hal will handle (1126) the command.

As shown in FIG. 11B, a standard handoff may include the device 110 outputting synthesized speech in the speech style of the requested assistant. For example, the device 110 may output (1130) the Alexa endpoint sound, and then output (1132) synthesized speech in the voice style associated with the Alexa assistant: "Hm, Hal?" The device 110 may crossfade (1134) from the Alexa listening visual to the Hal thinking visual. The second CPS 181 corresponding to Hal will handle (1136) the command.

As shown in FIG. 11C, a barge-in handoff may include the device 110 outputting synthesized speech in the speech style, not of the requested assistant, but of the selected assistant determined by the system 120 to handle the command. For example, the device 110 may output (1140) the Alexa endpoint sound, and then output (1142) synthesized speech in the voice style associated with the Hal assistant: "Hal, here . . . " The device 110 may crossfade (1144) from the Alexa listening visual to the Hal thinking visual. The second CPS 181 corresponding to Hal will handle (1146) the command.

A handoff may be performed at any point during a dialog. For example, the system may determine to handoff a single or first command received from the user. In other cases, the system may respond to a first command with a first assistant, but then handoff a second command directed to the same assistant during the same dialog to another assistant.

Figure 12:
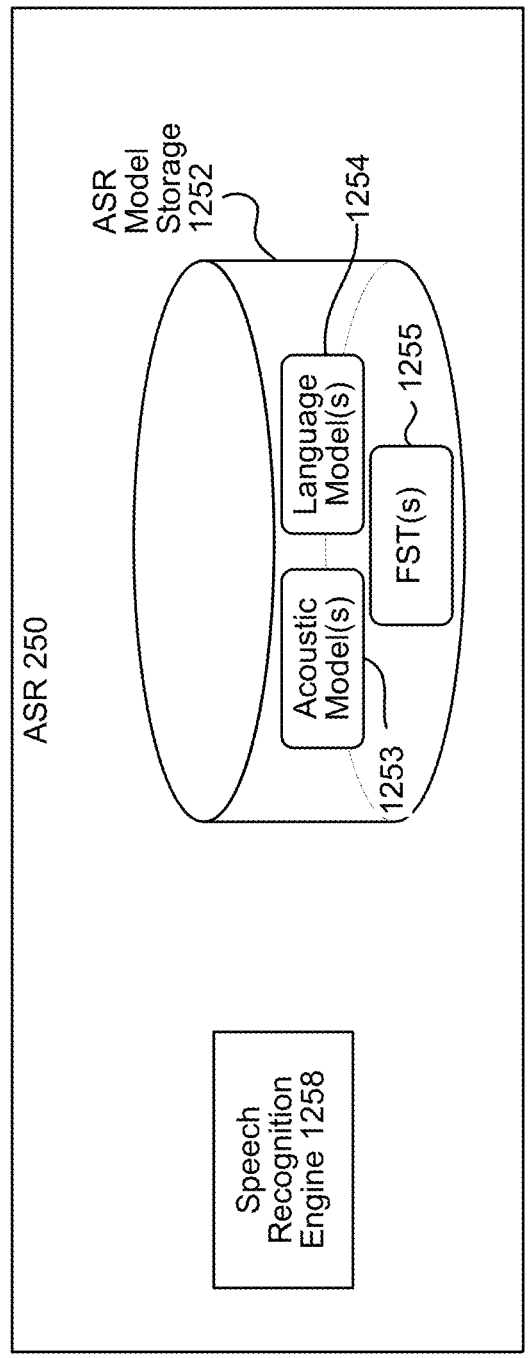
FIG. 12 is a conceptual diagram of an ASR component, according to embodiments of the present disclosure.

FIG. 12 is a conceptual diagram of an ASR component 250, according to embodiments of the present disclosure. The ASR component 250 may interpret a spoken natural language input based on the similarity between the spoken natural language input and pre-established language models 1254 stored in an ASR model storage 1252. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 1255 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1253 stored in the ASR model storage 1252), and the likelihood that a particular word, which matches the sounds, would be included in the sentence at the specific location (e.g., using a language or grammar model 1254). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 1258. The ASR component 250 receives audio data 211 (for example, received from a local device 110 having processed audio detected by a microphone by an acoustic front end (AFE) or other component). The speech recognition engine 1258 compares the audio data 211 with acoustic models 1253, language models 1254, FST(s) 1255, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the audio data 211 with reference to information stored in the ASR model storage 1252. Feature vectors of the audio data 211 may arrive at the system 120 encoded, in which case they may be decoded prior to processing by the speech recognition engine 1258.

The speech recognition engine 1258 attempts to match received feature vectors to language acoustic units (e.g., phonemes) and words as known in the stored acoustic models 1253, language models 1254, and FST(s) 1255. For example, audio data 211 may be processed by one or more acoustic model(s) 1253 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1254 (and/or using FST 1255) to determine ASR data 1410. The ASR data 1410 can include one or more hypotheses. One or more of the hypotheses represented in the ASR data 1410 may then be sent to further components (such as the NLU component 260) for further processing as discussed herein. The ASR data 1410 may include representations of text of an utterance, such as words, subword units, or the like.

The speech recognition engine 1258 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1258 may use the acoustic model(s) 1253 to attempt to match received audio feature vectors to words or subword acoustic units. An acoustic unit may be a senone, phoneme, phoneme in context, syllable, part of a syllable, syllable in context, or any other such portion of a word. The speech recognition engine 1258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 1258 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1258, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1258 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In some implementations, the ASR component 250 may load different and/or additional acoustic models 1253, FSTs 1255, and/or language models 1254 depending on a context associated with the received audio data 211. For example, the ASR component 250 may load different models depending on a user, device, device type, etc., associated with the audio data 211. In some implementations, the ASR component 250 may load models associated with assistants eligible and/or available for handling commands received from the device 110. Leveraging assistant-specific models may improve the quality of ASR result data and/or reduce the computational load of ASR processing.

Figure 13:
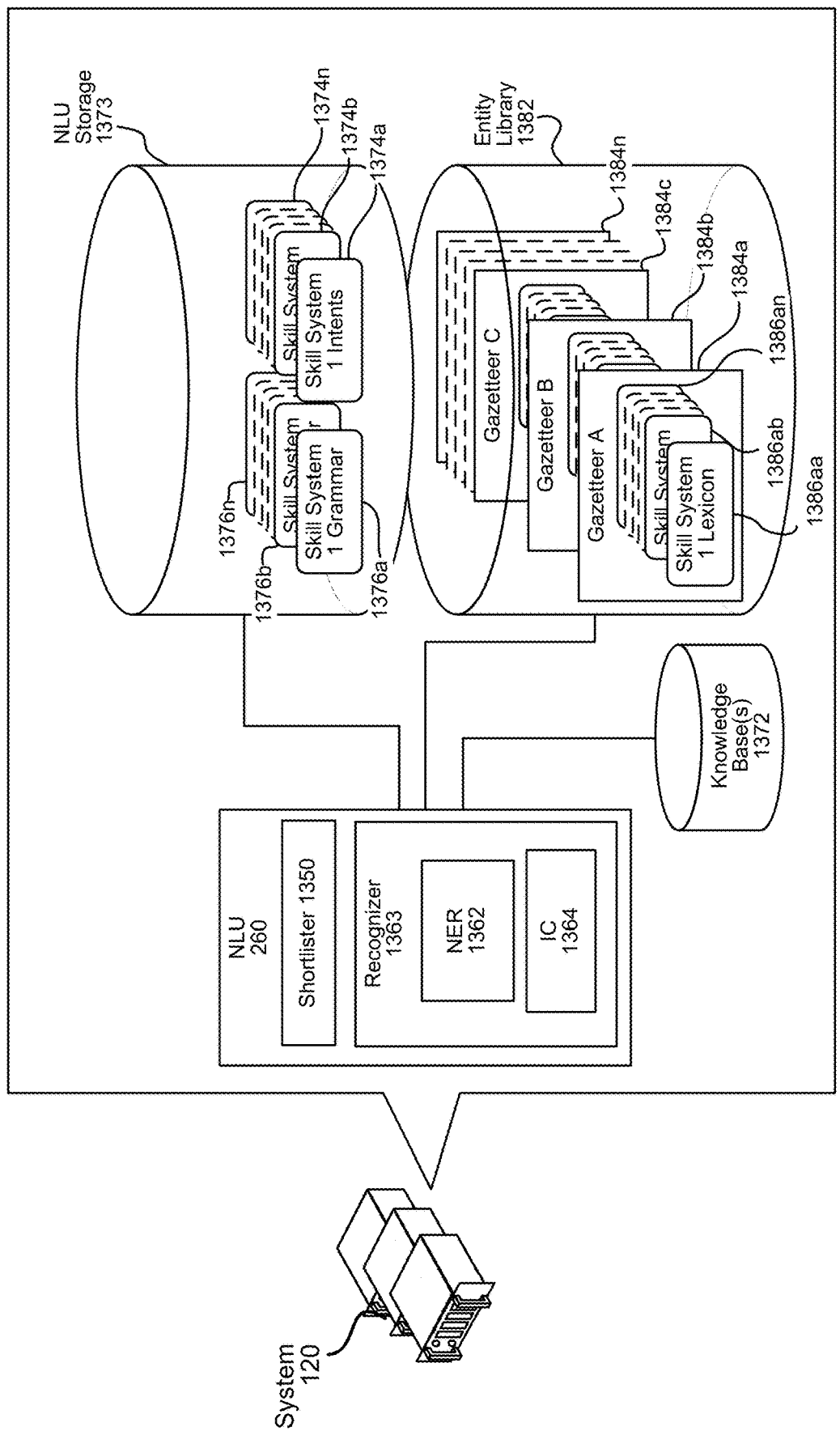
FIG. 13 is a conceptual diagram of how natural language processing is performed, according to embodiments of the present disclosure.
Figure 14:
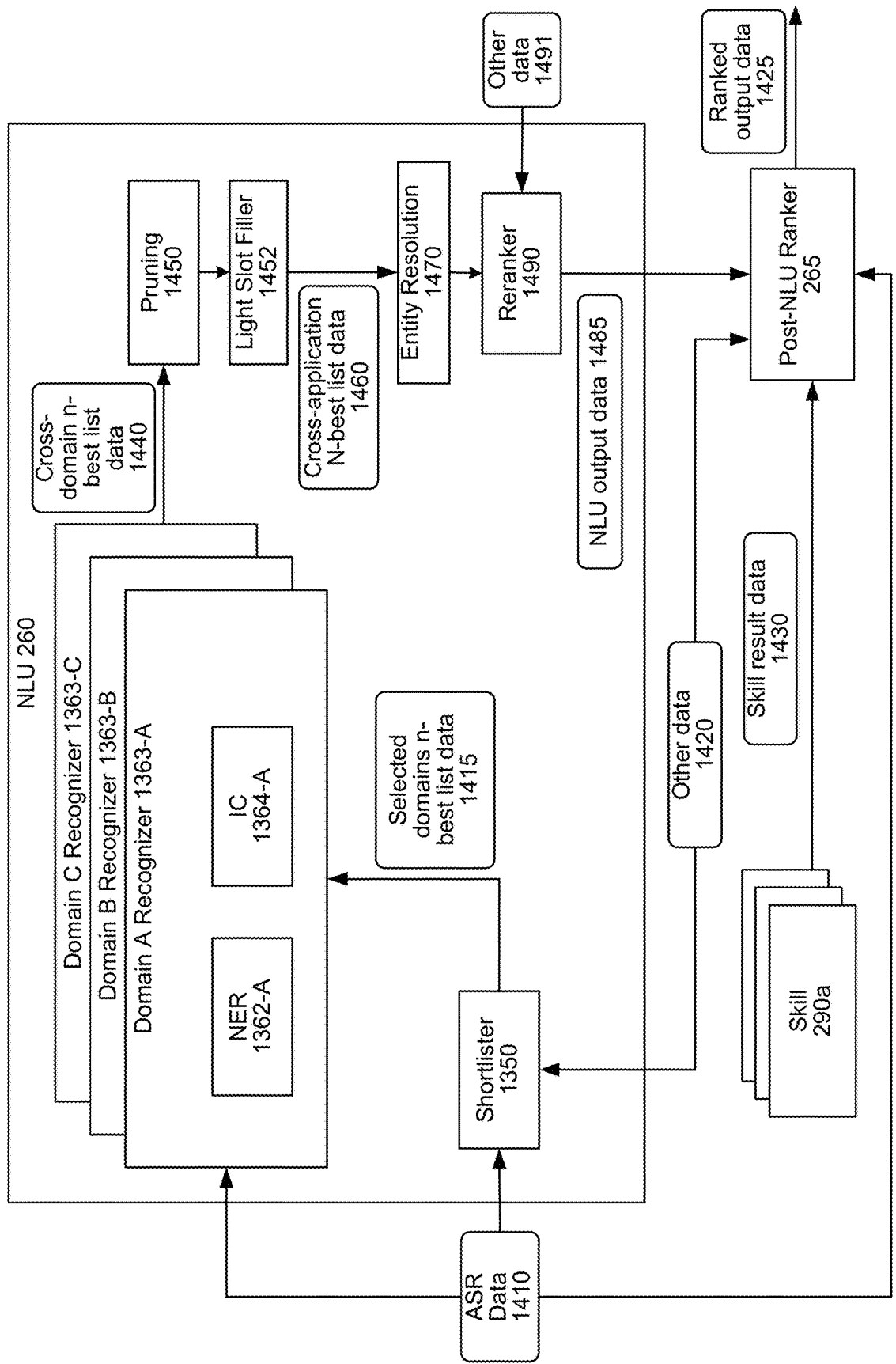
FIG. 14 is a conceptual diagram of how natural language processing is performed, according to embodiments of the present disclosure.

FIGS. 13 and 14 illustrates how the NLU component 260 may perform NLU processing. FIG. 13 is a conceptual diagram of how natural language processing is performed, according to embodiments of the present disclosure. And FIG. 14 is a conceptual diagram of how natural language processing is performed, according to embodiments of the present disclosure.

FIG. 13 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may leverage libraries of data related to intents, slot data, and/or entities. For example, the NLU component 260 may reference NLU storage 1371 and entity library 1382. The NLU storage 1373 may contain skill system grammars 1376 and skill system intents 1374. The entity library 1382 may include gazetteers 1384, each associated skill system lexicons 1386. The NLU component 260 may process ASR hypotheses based on the information in these various data. In some implementations, the NLU component 260 may add or remove portions of this various data depending on a list of assistants eligible and/or available for handling a given input. For example, different skill systems and/or intents may be relevant depending on which assistants are enabled for use with the device 110. Additionally or alternatively, a reranker or a post-NLU ranker (e.g., the reranker 1490 and/or post-NLU ranker 265 discussed below) may take into account assistant information when ranking NLU hypotheses.

The NLU component 260 may include a shortlister component 1350. The shortlister component 1350 selects skills that may execute with respect to ASR output data 1410 input to the NLU component 260 (e.g., applications that may execute with respect to the user input). The ASR output data 1410 (which may also be referred to as ASR data 1410) may include representations of text of an utterance, such as words, subword units, or the like. The shortlister component 1350 thus limits downstream, more resource intensive NLU processes to being performed with respect to skills that may execute with respect to the user input.

Without a shortlister component 1350, the NLU component 260 may process ASR output data 1410 input thereto with respect to every skill of the system, either in parallel, in series, or using some combination thereof. By implementing a shortlister component 1350, the NLU component 260 may process ASR output data 1410 with respect to only the skills that may execute with respect to the user input. This reduces total compute power and latency attributed to NLU processing.

The shortlister component 1350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1350 may be trained with respect to a different skill. Alternatively, the shortlister component 1350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1350. For example, some sample user inputs may be positive examples (e.g., user inputs that may be used to invoke the skill). Other sample user inputs may be negative examples (e.g., user inputs that may not be used to invoke the skill).

As described above, the shortlister component 1350 may include a different trained model for each skill of the system, a different trained model for each domain, or some other combination of trained model(s). For example, the shortlister component 1350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1350 to output indications of only a portion of the skills that the ASR output data 1410 may relate to. For example, a user input may correspond to "tell me about Tom Collins." If the model is clustered based on domain, the shortlister component 1350 may determine the user input corresponds to a recipe skill (e.g., a drink recipe) even though the user input may also correspond to an information skill (e.g., including information about a person named Tom Collins).

The NLU component 260 may include one or more recognizers 1363. In at least some embodiments, a recognizer 1363 may be associated with a skill system 125 (e.g., the recognizer may be configured to interpret text data to correspond to the skill system 125). In at least some examples, a recognizer 1363 may be associated with a domain such as smart home, video, music, weather, custom, etc. (e.g., the recognizer may be configured to interpret text data to correspond to the domain).

If the shortlister component 1350 determines ASR output data 1410 is potentially associated with multiple domains, the recognizers 1363 associated with the domains may process the ASR output data 1410, while recognizers 1363 not indicated in the shortlister component 1350's output may not process the ASR output data 1410. The "shortlisted" recognizers 1363 may process the ASR output data 1410 in parallel, in series, partially in parallel, etc. For example, if ASR output data 1410 potentially relates to both a communications domain and a music domain, a recognizer associated with the communications domain may process the ASR output data 1410 in parallel, or partially in parallel, with a recognizer associated with the music domain processing the ASR output data 1410.

Each recognizer 1363 may include a named entity recognition (NER) component 1362. The NER component 1362 attempts to identify grammars and lexical information that may be used to construe meaning with respect to text data input therein. The NER component 1362 identifies portions of text data that correspond to a named entity associated with a domain, associated with the recognizer 1363 implementing the NER component 1362. The NER component 1362 (or other component of the NLU component 260) may also determine whether a word refers to an entity whose identity is not explicitly mentioned in the text data, for example "him," "her," "it" or other anaphora, exophora, or the like.

Each recognizer 1363, and more specifically each NER component 1362, may be associated with a particular grammar database 1376, a particular set of intents/actions 1374, and a particular personalized lexicon 1386. Each gazetteer 1384 may include domain/skill-indexed lexical information associated with a particular user and/or device 110. For example, a Gazetteer A (1384a) includes skill-indexed lexical information 1386aa to 1386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1362 applies grammar information 1376 and lexical information 1386 associated with a domain (associated with the recognizer 1363 implementing the NER component 1362) to determine a mention of one or more entities in text data. In this manner, the NER component 1362 identifies "slots" (each corresponding to one or more particular words in text data) that may be useful for later processing. The NER component 1362 may also label each slot with a type (e.g., noun, place, city, artist name, song name, etc.).

Each grammar database 1376 includes the names of entities (i.e., nouns) commonly found in speech about the particular domain to which the grammar database 1376 relates, whereas the lexical information 1386 is personalized to the user and/or the device 110 from which the user input originated. For example, a grammar database 1376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (1384a-1384n) stored in an entity library storage 1382. The gazetteer information 1384 may be used to match text data (representing a portion of the user input) with text data representing known entities, such as song titles, contact names, etc. Gazetteers 1384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1363 may also include an intent classification (IC) component 1364. An IC component 1364 parses text data to determine an intent(s) (associated with the domain associated with the recognizer 1363 implementing the IC component 1364) that potentially represents the user input. An intent represents to an action a user desires be performed. An IC component 1364 may communicate with a database 1374 of words linked to intents. For example, a music intent database may link words and phrases such as "quiet," "volume off," and "mute" to a <Mute> intent. An IC component 1364 identifies potential intents by comparing words and phrases in text data (representing at least a portion of the user input) to the words and phrases in an intents database 1374 (associated with the domain that is associated with the recognizer 1363 implementing the IC component 1364).

The intents identifiable by a specific IC component 1364 are linked to domain-specific (i.e., the domain associated with the recognizer 1363 implementing the IC component 1364) grammar frameworks 1376 with "slots" to be filled. Each slot of a grammar framework 1376 corresponds to a portion of text data that the system believes corresponds to an entity. For example, a grammar framework 1376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1376 may not be structured as sentences, but rather based on associating slots with grammatical tags.

For example, an NER component 1362 may parse text data to identify words as subject, object, verb, preposition, etc. based on grammar rules and/or models prior to recognizing named entities in the text data. An IC component 1364 (implemented by the same recognizer 1363 as the NER component 1362) may use the identified verb to identify an intent. The NER component 1362 may then determine a grammar model 1376 associated with the identified intent. For example, a grammar model 1376 for an intent corresponding to <PlayMusic> may specify a list of slots applicable to play the identified "object" and any object modifier (e.g., a prepositional phrase), such as {Artist Name}, {Album Name}, {Song name}, etc. The NER component 1362 may then search corresponding fields in a lexicon 1386 (associated with the domain associated with the recognizer 1363 implementing the NER component 1362), attempting to match words and phrases in text data the NER component 1362 previously tagged as a grammatical object or object modifier with those identified in the lexicon 1386.

An NER component 1362 may perform semantic tagging, which is the labeling of a word or combination of words according to their type/semantic meaning. An NER component 1362 may parse text data using heuristic grammar rules, or a model may be constructed using techniques such as Hidden Markov Models, maximum entropy models, log linear models, conditional random fields (CRF), and the like. For example, an NER component 1362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1362 identifies "Play" as a verb based on a word database associated with the music domain, which an IC component 1364 (also implemented by the music domain recognizer) may determine corresponds to a <PlayMusic> intent. At this stage, no determination has been made as to the meaning of "mother's little helper" or "the rolling stones," but based on grammar rules and models, the NER component 1362 has determined the text of these phrases relates to the grammatical object (i.e., entity) of the user input represented in the text data.

An NER component 1362 may tag text data to attribute meaning thereto. For example, an NER component 1362 may tag "play mother's little helper by the rolling stones" as: {domain} Music, {intent}<PlayMusic>, {artist name} rolling stones, {media type} SONG, and {song title} mother's little helper. For further example, the NER component 1362 may tag "play songs by the rolling stones" as: {domain} Music, {intent}<PlayMusic>, {artist name} rolling stones, and {media type} SONG.

The shortlister component 1350 may receive ASR output data 1410 output from the ASR component 250 or output from the device 110b (as illustrated in FIG. 14). The ASR component 250 may embed the ASR output data 1410 into a form processable by a trained model(s) using sentence embedding techniques as known in the art. Sentence embedding results in the ASR output data 1410 including text in a structure that enables the trained models of the shortlister component 1450 to operate on the ASR output data 1410. For example, an embedding of the ASR output data 1410 may be a vector representation of the ASR output data 1410.

The shortlister component 1350 may make binary determinations (e.g., yes or no) regarding which domains relate to the ASR output data 1410. The shortlister component 1350 may make such determinations using the one or more trained models described herein above. If the shortlister component 1350 implements a single trained model for each domain, the shortlister component 1350 may simply run the models that are associated with enabled domains as indicated in a user profile associated with the device 110 and/or user that originated the user input.

The shortlister component 1350 may generate n-best list data 1415 representing domains that may execute with respect to the user input represented in the ASR output data 1410. The size of the n-best list represented in the n-best list data 1415 is configurable. In an example, the n-best list data 1415 may indicate every domain of the system as well as contain an indication, for each domain, regarding whether the domain is likely capable to execute the user input represented in the ASR output data 1410. In another example, instead of indicating every domain of the system, the n-best list data 1415 may only indicate the domains that are likely to be able to execute the user input represented in the ASR output data 1410. In yet another example, the shortlister component 1350 may implement thresholding such that the n-best list data 1415 may indicate no more than a maximum number of domains that may execute the user input represented in the ASR output data 1410. In an example, the threshold number of domains that may be represented in the n-best list data 1415 is ten. In another example, the domains included in the n-best list data 1415 may be limited by a threshold a score, where only domains indicating a likelihood to handle the user input is above a certain score (as determined by processing the ASR output data 1410 by the shortlister component 1350 relative to such domains) are included in the n-best list data 1415.

The ASR output data 1410 may correspond to more than one ASR hypothesis. When this occurs, the shortlister component 1350 may output a different n-best list (represented in the n-best list data 1415) for each ASR hypothesis. Alternatively, the shortlister component 1350 may output a single n-best list representing the domains that are related to the multiple ASR hypotheses represented in the ASR output data 1410.

As indicated above, the shortlister component 1350 may implement thresholding such that an n-best list output therefrom may include no more than a threshold number of entries. If the ASR output data 1410 includes more than one ASR hypothesis, the n-best list output by the shortlister component 1350 may include no more than a threshold number of entries irrespective of the number of ASR hypotheses output by the ASR component 250. Alternatively or in addition, the n-best list output by the shortlister component 1350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1410, the shortlister component 1350 may generate confidence scores representing likelihoods that domains relate to the ASR output data 1410. If the shortlister component 1350 implements a different trained model for each domain, the shortlister component 1350 may generate a different confidence score for each individual domain trained model that is run. If the shortlister component 1350 runs the models of every domain when ASR output data 1410 is received, the shortlister component 1350 may generate a different confidence score for each domain of the system. If the shortlister component 1350 runs the models of only the domains that are associated with skills indicated as enabled in a user profile associated with the device 110 and/or user that originated the user input, the shortlister component 1350 may only generate a different confidence score for each domain associated with at least one enabled skill. If the shortlister component 1350 implements a single trained model with domain specifically trained portions, the shortlister component 1350 may generate a different confidence score for each domain who's specifically trained portion is run. The shortlister component 1350 may perform matrix vector modification to obtain confidence scores for all domains of the system in a single instance of processing of the ASR output data 1410.

N-best list data 1415 including confidence scores that may be output by the shortlister component 1350 may be represented as, for example:

Search domain, 0.67
Recipe domain, 0.62
Information domain, 0.57
Shopping domain, 0.42

As indicated, the confidence scores output by the shortlister component 1350 may be numeric values. The confidence scores output by the shortlister component 1350 may alternatively be binned values (e.g., high, medium, low).

The n-best list may only include entries for domains having a confidence score satisfying (e.g., equaling or exceeding) a minimum threshold confidence score. Alternatively, the shortlister component 1350 may include entries for all domains associated with user enabled skills, even if one or more of the domains are associated with confidence scores that do not satisfy the minimum threshold confidence score.

The shortlister component 1350 may consider other data 1420 when determining which domains may relate to the user input represented in the ASR output data 1410 as well as respective confidence scores. The other data 1420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1420 may include an indicator of the user associated with the ASR output data 1410, for example as determined by the user recognition component 295.

The other data 1420 may be character embedded prior to being input to the shortlister component 1350. The other data 1420 may alternatively be embedded using other techniques known in the art prior to being input to the shortlister component 1350.

The other data 1420 may also include data indicating the domains associated with skills that are enabled with respect to the device 110 and/or user that originated the user input. The shortlister component 1350 may use such data to determine which domain-specific trained models to run. That is, the shortlister component 1350 may determine to only run the trained models associated with domains that are associated with user-enabled skills. The shortlister component 1350 may alternatively use such data to alter confidence scores of domains.

As an example, considering two domains, a first domain associated with at least one enabled skill and a second domain not associated with any user-enabled skills of the user that originated the user input, the shortlister component 1350 may run a first model specific to the first domain as well as a second model specific to the second domain. Alternatively, the shortlister component 1350 may run a model configured to determine a score for each of the first and second domains. The shortlister component 1350 may determine a same confidence score for each of the first and second domains in the first instance. The shortlister component 1350 may then alter those confidence scores based on which domains is associated with at least one skill enabled by the present user. For example, the shortlister component 1350 may increase the confidence score associated with the domain associated with at least one enabled skill while leaving the confidence score associated with the other domain the same. Alternatively, the shortlister component 1350 may leave the confidence score associated with the domain associated with at least one enabled skill the same while decreasing the confidence score associated with the other domain. Moreover, the shortlister component 1350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 1350 receives the ASR output data 1410, the shortlister component 1350 may determine whether profile data associated with the user and/or device 110 that originated the command includes an indication of enabled skills.

The other data 1420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1350 may use such data to determine which domain-specific trained models to run. For example, if the device 110 corresponds to a displayless type device, the shortlister component 1350 may determine not to run trained models specific to domains that output video data. The shortlister component 1350 may alternatively use such data to alter confidence scores of domains.

As an example, considering two domains, one that outputs audio data and another that outputs video data, the shortlister component 1350 may run a first model specific to the domain that generates audio data as well as a second model specific to the domain that generates video data. Alternatively the shortlister component 1350 may run a model configured to determine a score for each domain. The shortlister component 1350 may determine a same confidence score for each of the domains in the first instance. The shortlister component 1350 may then alter the original confidence scores based on the type of the device 110 that originated the user input corresponding to the ASR output data 1410. For example, if the device 110 is a displayless device, the shortlister component 1350 may increase the confidence score associated with the domain that generates audio data while leaving the confidence score associated with the domain that generates video data the same. Alternatively, if the device 110 is a displayless device, the shortlister component 1350 may leave the confidence score associated with the domain that generates audio data the same while decreasing the confidence score associated with the domain that generates video data. Moreover, if the device 110 is a displayless device, the shortlister component 1350 may increase the confidence score associated with the domain that generates audio data as well as decrease the confidence score associated with the domain that generates video data.

The type of device information represented in the other data 1420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1420 may represent the smart TV of other display device, and not the displayless device that captured the spoken user input.

The other data 1420 may also include data indicating the user input originating device's speed, location, or other mobility information. For example, the device may correspond to a vehicle including a display. If the vehicle is moving, the shortlister component 1350 may decrease the confidence score associated with a domain that generates video data as it may be undesirable to output video content to a user while the user is driving. The device may output data to the system(s) 120 indicating when the device is moving.

The other data 1420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1350 may use such data to alter confidence scores of domains. For example, the shortlister component 1350 may run a first model specific to a first domain as well as a second model specific to a second domain. Alternatively, the shortlister component 1350 may run a model configured to determine a score for each domain. The shortlister component 1350 may also determine a same confidence score for each of the domains in the first instance. The shortlister component 1350 may then alter the original confidence scores based on the first domain being invoked to cause the system to output content while the current user input was received. Based on the first domain being invoked, the shortlister component 1350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1415 generated by the shortlister component 1350 as well as the different types of other data 1420 considered by the shortlister component 1350 are configurable. For example, the shortlister component 1350 may update confidence scores as more other data 1420 is considered. For further example, the n-best list data 1415 may exclude relevant domains if thresholding is implemented. Thus, for example, the shortlister component 1350 may include an indication of a domain in the n-best list 1415 unless the shortlister component 1350 is one hundred percent confident that the domain may not execute the user input represented in the ASR output data 1410 (e.g., the shortlister component 1350 determines a confidence score of zero for the domain).

The shortlister component 1350 may send the ASR output data 1410 to recognizers 1363 associated with domains represented in the n-best list data 1415. Alternatively, the shortlister component 1350 may send the n-best list data 1415 or some other indicator of the selected subset of domains to another component (such as the orchestrator component 230) which may in turn send the ASR output data 1410 to the recognizers 1363 corresponding to the domains included in the n-best list data 1415 or otherwise indicated in the indicator. If the shortlister component 1350 generates an n-best list representing domains without any associated confidence scores, the shortlister component 1350/orchestrator component 230 may send the ASR output data 1410 to recognizers 1363 associated with domains that the shortlister component 1350 determines may execute the user input. If the shortlister component 1350 generates an n-best list representing domains with associated confidence scores, the shortlister component 1350/orchestrator component 230 may send the ASR output data 1410 to recognizers 1363 associated with domains associated with confidence scores satisfying (e.g., meeting or exceeding) a threshold minimum confidence score.

A recognizer 1363 may output tagged text data generated by an NER component 1362 and an IC component 1364, as described herein above. The NLU component 260 may compile the output tagged text data of the recognizers 1363 into a single cross-domain n-best list 1440 and may send the cross-domain n-best list 1440 to a pruning component 1450. Each entry of tagged text (e.g., each NLU hypothesis) represented in the cross-domain n-best list data 1440 may be associated with a respective score indicating a likelihood that the NLU hypothesis corresponds to the domain associated with the recognizer 1363 from which the NLU hypothesis was output. For example, the cross-domain n-best list data 1440 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1450 may sort the NLU hypotheses represented in the cross-domain n-best list data 1440 according to their respective scores. The pruning component 1450 may perform score thresholding with respect to the cross-domain NLU hypotheses. For example, the pruning component 1450 may select NLU hypotheses associated with scores satisfying (e.g., meeting and/or exceeding) a threshold score. The pruning component 1450 may also or alternatively perform number of NLU hypothesis thresholding. For example, the pruning component 1450 may select the top scoring NLU hypothesis(es). The pruning component 1450 may output a portion of the NLU hypotheses input thereto. The purpose of the pruning component 1450 is to create a reduced list of NLU hypotheses so that downstream, more resource intensive, processes may only operate on the NLU hypotheses that most likely represent the user's intent.

The NLU component 260 may include a light slot filler component 1452. The light slot filler component 1452 can take text from slots represented in the NLU hypotheses output by the pruning component 1450 and alter them to make the text more easily processed by downstream components. The light slot filler component 1452 may perform low latency operations that do not involve heavy operations such as reference to a knowledge base (e.g., 1372. The purpose of the light slot filler component 1452 is to replace words with other words or values that may be more easily understood by downstream components. For example, if a NLU hypothesis includes the word "tomorrow," the light slot filler component 1452 may replace the word "tomorrow" with an actual date for purposes of downstream processing. Similarly, the light slot filler component 1452 may replace the word "CD" with "album" or the words "compact disc." The replaced words are then included in the cross-application n-best list data 1460.

The cross-application n-best list data 1460 may be input to an entity resolution component 1470. The entity resolution component 1470 can apply rules or other instructions to standardize labels or tokens from previous stages into an intent/slot representation. The precise transformation may depend on the domain. For example, for a travel domain, the entity resolution component 1470 may transform text corresponding to "Boston airport" to the standard BOS three-letter code referring to the airport. The entity resolution component 1470 can refer to a knowledge base (e.g., 1372) that is used to specifically identify the precise entity referred to in each slot of each NLU hypothesis represented in the cross-application n-best list data 1460. Specific intent/slot combinations may also be tied to a particular source, which may then be used to resolve the text. In the example "play songs by the stones," the entity resolution component 1470 may reference a personal music catalog, Amazon Music account, a user profile, or the like. The entity resolution component 1470 may output an altered n-best list that is based on the cross-application n-best list 1460 but that includes more detailed information (e.g., entity IDs) about the specific entities mentioned in the slots and/or more detailed slot data that can eventually be used by a skill. The NLU component 260 may include multiple entity resolution components 1470 and each entity resolution component 1470 may be specific to one or more domains.

The NLU component 260 may include a reranker 1490. The reranker 1490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1470.

The reranker 1490 may apply re-scoring, biasing, or other techniques. The reranker 1490 may consider not only the data output by the entity resolution component 1470, but may also consider other data 1491. The other data 1491 may include a variety of information. For example, the other data 1491 may include skill rating or popularity data. For example, if one skill has a high rating, the reranker 1490 may increase the score of a NLU hypothesis that may be processed by the skill. The other data 1491 may also include information about skills that have been enabled by the user that originated the user input. For example, the reranker 1490 may assign higher scores to NLU hypothesis that may be processed by enabled skills than NLU hypothesis that may be processed by non-enabled skills. The other data 1491 may also include data indicating user usage history, such as if the user that originated the user input regularly uses a particular skill or does so at particular times of day. The other data 1491 may additionally include data indicating date, time, location, weather, type of device 110, user identifier, context, as well as other information. For example, the reranker 1490 may consider when any particular skill is currently active (e.g., music being played, a game being played, etc.).

As illustrated and described, the entity resolution component 1470 is implemented prior to the reranker 1490. The entity resolution component 1470 may alternatively be implemented after the reranker 1490. Implementing the entity resolution component 1470 after the reranker 1490 limits the NLU hypotheses processed by the entity resolution component 1470 to only those hypotheses that successfully pass through the reranker 1490.

The reranker 1490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 1350 may only process with respect to these latter domains. Results of these two NLU processing paths may be merged into NLU output data 1485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 1485, skill result data 1430, and the other data 1420 in order to output ranked output data 1425. The ranked output data 1425 may include an n-best list where the NLU hypotheses in the NLU results data 1485 are reordered such that the n-best list in the ranked output data 1425 represents a prioritized list of skills to respond to a user input as determined by the post-NLU ranker 265. The ranked output data 1425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 1485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 1430 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 1430a generated from the first skill 290a's execution with respect to the first NLU hypothesis. The post-NLU ranker 265 also receives, from the second skill 290b, second results data 1430b generated from the second skill 290b's execution with respect to the second NLU hypothesis.

The result data 1430 may include various portions. For example, the result data 1430 may include content (e.g., audio data, text data, and/or video data) to be output to a user. The result data 1430 may also include a unique identifier used by the system(s) 120 and/or the skill system(s) 125 to locate the data to be output to a user. The result data 1430 may also include an instruction. For example, if the user input corresponds to "turn on the light," the result data 1430 may include an instruction causing the system to turn on a light associated with a profile of the device (110a/110b) and/or user.

The post-NLU ranker 265 may consider the first result data 1430a and the second result data 1430b to alter the first confidence score and the second confidence score of the first NLU hypothesis and the second NLU hypothesis, respectively. That is, the post-NLU ranker 265 may generate a third confidence score based on the first result data 1430a and the first confidence score. The third confidence score may correspond to how likely the post-NLU ranker 265 determines the first skill will correctly respond to the user input. The post-NLU ranker 265 may also generate a fourth confidence score based on the second result data 1430b and the second confidence score. One skilled in the art will appreciate that a first difference between the third confidence score and the fourth confidence score may be greater than a second difference between the first confidence score and the second confidence score. The post-NLU ranker 265 may also consider the other data 1420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 1430 associated with the skill 290 with the highest altered confidence score to be the data output in response to the current user input. The post-NLU ranker 265 may also consider the ASR output data 1410 to alter the NLU hypotheses confidence scores.

The orchestrator component 230 may, prior to sending the NLU results data 1485 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 1485, including NLU hypotheses paired with skills 290, to the post-NLU ranker 265. In response to ASR output data 1410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 1485, to provide result data 1430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 1430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 1430 indicating slots of a framework that the skill 290 further needs filled or entities that the skill 290 further needs resolved prior to the skill 290 being able to provided result data 1430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 1430 provided by the skills 290 to alter the NLU processing confidence scores generated by the reranker 1490. That is, the post-NLU ranker 265 uses the result data 1430 provided by the queried skills 290 to create larger differences between the NLU processing confidence scores generated by the reranker 1490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 1430 responsive to NLU hypotheses over skills 290 that provide result data 1430 corresponding to an indication that further information is needed, as well as skills 290 that provide result data 1430 indicating they can provide multiple responses to received NLU hypotheses. For example, the post-NLU ranker 265 may generate a first score for a first skill 290*a* that is greater than the first skill's NLU confidence score based on the first skill 290*a* providing result data 1430 including a response to a NLU hypothesis. For further example, the post-NLU ranker 265 may generate a second score for a second skill 290*b* that is less than the second skill's NLU confidence score based on the second skill 290*b* providing result data 1430*b* indicating further information is needed for the second skill 290*b* to provide a response to a NLU hypothesis. Yet further, for example, the post-NLU ranker 265 may generate a third score for a third skill 290*c* that is less than the third skill's NLU confidence score based on the third skill 290*c* providing result data 1430*c* indicating the third skill 290*c* can provide multiple responses to a NLU hypothesis.

The post-NLU ranker 265 may consider other data 1420 in determining scores. The other data 1420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290*a* that is greater than the first skill's NLU processing confidence score based on the first skill 290*a* being associated with a high ranking. For further example, the post-NLU ranker 265 may generate a second score for a second skill 290*b* that is less than the second skill's NLU processing confidence score based on the second skill 290*b* being associated with a low ranking.

The other data 1420 may include information indicating whether or not the user that originated the user input has enabled one or more of the queried skills 290. For example, the post-NLU ranker 265 may generate a first score for a first skill 290*a* that is greater than the first skill's NLU processing confidence score based on the first skill 290*a* being enabled by the user that originated the user input. For further example, the post-NLU ranker 265 may generate a second score for a second skill 290*b* that is less than the second skill's NLU processing confidence score based on the second skill 290*b* not being enabled by the user that originated the user input. When the post-NLU ranker 265 receives the NLU results data 1485, the post-NLU ranker 265 may determine whether profile data, associated with the user and/or device that originated the user input, includes indications of enabled skills.

The other data 1420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 1420 may include information indicating the veracity of the result data 1430 provided by a skill 290. For example, if a user says "tell me a recipe for pasta sauce," a first skill 290*a* may provide the post-NLU ranker 265 with first result data 1430*a* corresponding to a first recipe associated with a five star rating and a second skill 290*b* may provide the post-NLU ranker 265 with second result data 1430*b* corresponding to a second recipe associated with a one star rating. In this situation, the post-NLU ranker 265 may increase the NLU processing confidence score associated with the first skill 290*a* based on the first skill 290*a* providing the first result data 1430*a* associated with the five star rating and/or decrease the NLU processing confidence score associated with the second skill 290*b* based on the second skill 290*b* providing the second result data 1430*b* associated with the one star rating.

The other data 1420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290*a* corresponding to a room service skill associated with the hotel and/or decrease the NLU processing confidence score associated with a second skill 290*b* corresponding to a food skill not associated with the hotel.

The other data 1420 may include information indicating a location of the device and/or user that originated the user input. The system may be configured with skills 290 that may only operate with respect to certain geographic locations. For example, a user may provide a user input corresponding to "when is the next train to Portland." A first skill 290*a* may operate with respect to trains that arrive at, depart from, and pass through Portland, Oreg. A second skill 290*b* may operate with respect to trains that arrive at, depart from, and pass through Portland, Me. If the device and/or user that originated the user input is located in Seattle, Wash., the post-NLU ranker 265 may increase the NLU processing confidence score associated with the first skill 290*a* and/or decrease the NLU processing confidence score associated with the second skill 290*b*. Likewise, if the device and/or user that originated the user input is located in Boston, Mass., the post-NLU ranker 265 may increase the NLU processing confidence score associated with the second skill 290*b* and/or decrease the NLU processing confidence score associated with the first skill 290*a*.

The other data 1420 may include information indicating a time of day. The system may be configured with skills 290 that operate with respect to certain times of day. For example, a user may provide a user input corresponding to "order me food." A first skill 290*a* may generate first result data 1430*a* corresponding to breakfast. A second skill 290*b* may generate second result data 1430*b* corresponding to dinner. If the system(s) 120 receives the user input in the morning, the post-NLU ranker 265 may increase the NLU processing confidence score associated with the first skill 290*a* and/or decrease the NLU processing score associated with the second skill 290*b*. If the system(s) 120 receives the user input in the afternoon or evening, the post-NLU ranker 265 may increase the NLU processing confidence score associated with the second skill 290*b* and/or decrease the NLU processing confidence score associated with the first skill 290*a*.

The other data 1420 may include information indicating user preferences. The system may include multiple skills 290 configured to execute in substantially the same manner. For example, a first skill 290*a* and a second skill 290*b* may both be configured to order food from respective restaurants. The system may store a user preference (e.g., in the profile storage 270) that is associated with the user that provided the user input to the system(s) 120 as well as indicates the user prefers the first skill 290*a* over the second skill 290*b*. Thus, when the user provides a user input that may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 1420 may include information indicating system usage history associated with the user that originated the user input. For example, the system usage history may indicate the user originates user inputs that invoke a first skill 290*a* more often than the user originates user inputs that invoke a second skill 290*b*. Based on this, if the present user input may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 1420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290*a* that generates audio data. The post-NLU ranker 265 may also or alternatively decrease the NLU processing confidence score associated with a second skill 290*b* that generates image data or video data.

The other data 1420 may include information indicating how long it took a skill 290 to provide result data 1430 to the post-NLU ranker 265. When the post-NLU ranker 265 multiple skills 290 for result data 1430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 1420 to increase and decrease NLU processing confidence scores associated with various skills 290 that the post-NLU ranker 265 has already requested result data from. Alternatively, the post-NLU ranker 265 may use the other data 1420 to determine which skills 290 to request result data from. For example, the post-NLU ranker 265 may use the other data 1420 to increase and/or decrease NLU processing confidence scores associated with skills 290 associated with the NLU results data 1485 output by the NLU component 260. The post-NLU ranker 265 may select n-number of top scoring altered NLU processing confidence scores. The post-NLU ranker 265 may then request result data 1430 from only the skills 290 associated with the selected n-number of NLU processing confidence scores.

As described, the post-NLU ranker 265 may request result data 1430 from all skills 290 associated with the NLU results data 1485 output by the NLU component 260. Alternatively, the system(s) 120 may prefer result data 1430 from skills implemented entirely by the system(s) 120 rather than skills at least partially implemented by the skill system(s) 125. Therefore, in the first instance, the post-NLU ranker 265 may request result data 1430 from only skills associated with the NLU results data 1485 and entirely implemented by the system(s) 120. The post-NLU ranker 265 may only request result data 1430 from skills associated with the NLU results data 1485, and at least partially implemented by the skill system(s) 125, if none of the skills, wholly implemented by the system(s) 120, provide the post-NLU ranker 265 with result data 1430 indicating either data response to the NLU results data 1485, an indication that the skill can execute the user input, or an indication that further information is needed.

As indicated above, the post-NLU ranker 265 may request result data 1430 from multiple skills 290. If one of the skills 290 provides result data 1430 indicating a response to a NLU hypothesis and the other skills provide result data 1430 indicating either they cannot execute or they need further information, the post-NLU ranker 265 may select the result data 1430 including the response to the NLU hypothesis as the data to be output to the user. If more than one of the skills 290 provides result data 1430 indicating responses to NLU hypotheses, the post-NLU ranker 265 may consider the other data 1420 to generate altered NLU processing confidence scores, and select the result data 1430 of the skill associated with the greatest score as the data to be output to the user.

A system that does not implement the post-NLU ranker 265 may select the highest scored NLU hypothesis in the NLU results data 1485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 1485 to provide result data 1430 to the post-NLU ranker 265 prior to the post-NLU ranker 265 ultimately determining the skill 290 to be invoked to respond to the user input. Some of the skills 290 may provide result data 1430 indicating responses to NLU hypotheses while other skills 290 may providing result data 1430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 1430, associated with the skill 290 associated with the highest score, for output to the user. Alternatively, the post-NLU ranker 265 may output ranked output data 1425 indicating skills 290 and their respective post-NLU ranker rankings. Since the post-NLU ranker 265 receives result data 1430, potentially corresponding to a response to the user input, from the skills 290 prior to post-NLU ranker 265 selecting one of the skills or outputting the ranked output data 1425, little to no latency occurs from the time skills provide result data 1430 and the time the system outputs responds to the user.

If the post-NLU ranker 265 selects result audio data to be output to a user and the system determines content should be output audibly, the post-NLU ranker 265 (or another component of the system(s) 120) may cause the vehicle 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the vehicle 110a and/or the device 110b to output audio corresponding to the output audio data.

As described, a skill 290 may provide result data 1430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 1430 indicating a response to the user input, the post-NLU ranker 265 (or another component of the system(s) 120, such as the orchestrator component 230) may simply cause content corresponding to the result data 1430 to be output to the user. For example, the post-NLU ranker 265 may send the result data 1430 to the orchestrator component 230. The orchestrator component 230 may cause the result data 1430 to be sent to the device (110a/110b), which may output audio and/or display text corresponding to the result data 1430. The orchestrator component 230 may send the result data 1430 to the ASR component 250 to generate output text data and/or may send the result data 1430 to the TTS component 280 to generate output audio data, depending on the situation.

The skill 290 associated with the highest post-NLU ranker score may provide the post-NLU ranker 265 with result data 1430 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 1430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 1430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 1430, the system may further engage a transactional skill 290 after the transactional skill 290 provides the post-NLU ranker 265 with result data 1430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 15:
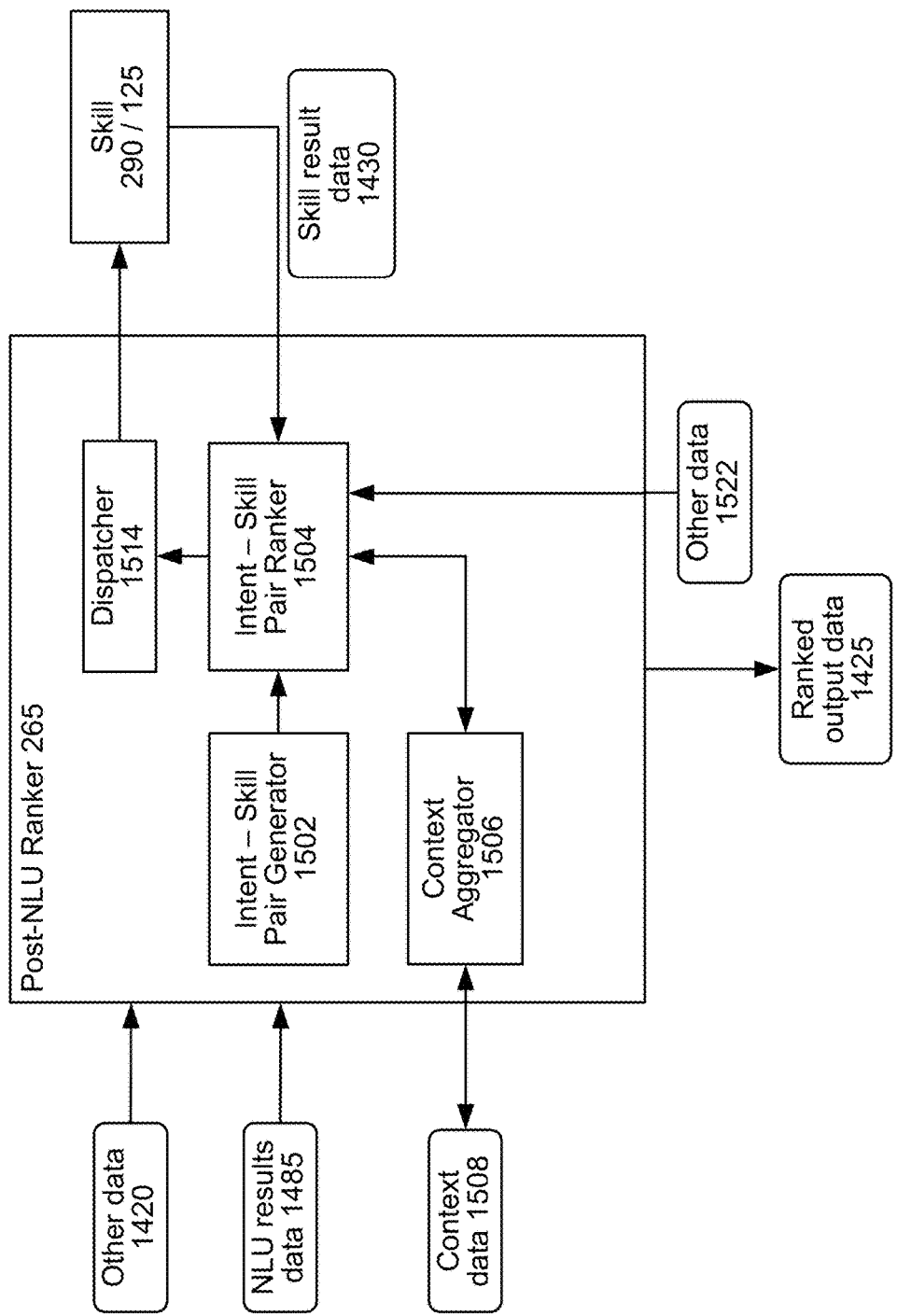
FIG. 15 is a conceptual diagram illustrating how a post-NLU ranker may process according to embodiments of the present disclosure.

FIG. 15 illustrates other configurations and operations of the post-NLU ranker 265. When the post-NLU ranker 265 receives NLU results data 1485, the NLU results data 1485 may be sent to an intent-skill pair generator 1502. The intent-skill pair generator 1502 may include information about what skills are capable of handling what intents. Such information may be context agnostic, and may thus indicate what skills are capable of handling what intents generally, without regard to the context associated with the user input. The intent-skill pair generator 1502 thus receives the NLU results data 1485 and identifies what particular candidate skills may handle the intent for NLU hypothesis. For example, if a NLU hypothesis includes a particular intent, the intent-skill pair generator 1502 identifies each skill that may execute with respect to the intent. For further example, if the NLU results data 1485 include multiple NLU hypotheses including multiple intents, the intent-skill pair generator 1502 associates each different NLU hypothesis with each skill that may execute with respect to the NLU hypothesis. As illustrated, the intent-skill pair generator 1502 may be implemented at part of the post-NLU ranker 265. However, one skill in the art will appreciate that the intent-skill pair generator 1502 may be implemented as part of the NLU component 260 or in another component without departing from the present disclosure. In such a case, the NLU results data 1485 may include intent-skill pairs.

The post-NLU ranker 265 may also include an intent-skill pair ranker 1504. The intent-skill pair ranker 1504 ranks the intent-skill pairs generated by the intent-skill pair generator 1502 based on, for example, the number of filled slots of a NLU hypothesis, an NLU confidence score associated with a NLU hypothesis, context information output by a context aggregator 1506, and/or other data.

The post-NLU ranker 265 may include the context aggregator 1506. The context aggregator 1506 receives context data 1508 from various contextual sources. The context data 1508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 1506 may aggregate the context data 1508 and put the context data 1508 in a form that can be processed by the intent-skill pair ranker 1504. Context data 1508 may include data obtained from the device 110 or from other services connected to the system(s) 120.

The context data 1508 may include skill availability data. Such information may indicate what skills are available and authorized to process the user input. For example, if the user has only enabled certain skills, the enabled skills may be noted in the skill availability data.

The context data 1508 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 230, skill(s) 290, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 1508 may be one portion of the data used by the intent-skill pair ranker 1504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 1508 (and/or other data 1522) may include a metadata flag/indicator that represents whether the particular skill being executed is one that can handle a go-back (or other navigational) request.

The context data 1508 may also include user profile data. The user profile data may represent preferences and/or characteristics of the user that originated the current user input. Such data may be received from the profile storage 270.

The context data 1508 may also include location data. The location data may represent a location of the device 110 from which the user input was received.

The context data 1508 may also include anaphora data. Anaphora data may be data used to resolve anaphora, exophora, or other references (like pronouns such as he, she, etc.) to entities that are not explicitly named in a user input.

The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1508 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 1508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1508 may also include other context data not explicitly recited herein.

The intent-skill pair ranker 1504 may operate one or more trained models that are configured to process the NLU results data 1485, skill result data 1430, and other data 1522 in order to determine a single best skill for executing the current user input from the available pairs output by the intent-skill pair generator 1502. The intent-skill pair ranker 1504 may send queries to the skills and request a first skill and a second skill (for example the candidate skills identified by the pair generator 1502), to provide potential result data indicating whether the skill can handle the intent at the particular moment and if so, what the output data for the particular skill would be (e.g., data the skill would provide to a user if the skill were selected to execute the user input) based on the NLU results data 1485. For example, the intent-skill pair ranker 1504 may send a first NLU hypothesis, associated with a first skill, to the first skill along with a request for the first skill to at least partially execute with respect to the first NLU hypothesis. The intent-skill pair ranker 1504 may also send a second NLU hypothesis, associated with the second skill, to the second skill along with a request for the second skill to at least partially execute with respect to the second NLU hypothesis. The intent-skill pair ranker 1504 receives, from the first skill, first result data 1430a generated from the first skill's execution with respect to the first NLU hypothesis. The intent-skill pair ranker 1504 also receives, from the second skill, second results data 1430b generated from the second skill's execution with respect to the second NLU hypothesis. Based on the first results data 1430a, a first NLU confidence score associated with the first NLU hypothesis, the second results data 1430b, a second NLU confidence score associated with the second NLU hypothesis, and other data 1522 (e.g., context data, user profile data, etc.), the intent-skill pair ranker 1504 determines the best skill for executing the current user input. The intent-skill pair ranker 1504 sends an indication of the best skill to a dispatcher component 1514.

The dispatcher 1514 may then send the selected skill the information needed to execute the user input, including an indication of the intent, the appropriate context data 1508 (such as device identifier, user identifier, or the like), slot data, utterance identifier, dialogue identifier, or any other information needed.

One or more models implemented by components of the orchestrator component 230, post-NLU ranker 265, short-lister 1350, or other component may be trained and operated according to various machine learning techniques.

Figure 16:
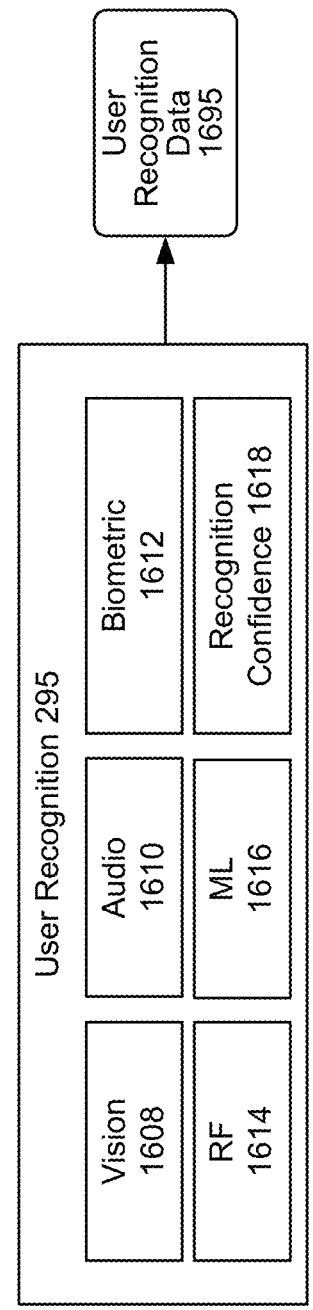
FIG. 16 is a schematic diagram of an illustrative architecture in which sensor data is combined to recognize one or more users according to embodiments of the present disclosure.

The device 110 and/or the system(s) 120 may include a user recognition component 295 that recognizes one or more users using a variety of data. As illustrated in FIG. 16, the user recognition component 295 may include one or more subcomponents including a vision component 1608, an audio component 1610, a biometric component 1612, a radio frequency (RF) component 1614, a machine learning (ML) component 1616, and a recognition confidence component 1618. In some instances, the user recognition component 295 may monitor data and determinations from one or more subcomponents to determine an identity of one or more users associated with data input to the device 110 and/or the system(s) 120. The user recognition component 295 may output user recognition data 1695, which may include a user identifier associated with a user the user recognition component 295 determines originated data input to the device 110 and/or the system(s) 120. The user recognition data 1695 may be used to inform processes performed by various components of the device 110 and/or the system(s) 120.

The vision component 1608 may receive data from one or more sensors capable of providing images (e.g., cameras) or sensors indicating motion (e.g., motion sensors). The vision component 1608 can perform facial recognition or image analysis to determine an identity of a user and to associate that identity with a user profile associated with the user. In some instances, when a user is facing a camera, the vision component 1608 may perform facial recognition and identify the user with a high degree of confidence. In other instances, the vision component 1608 may have a low degree of confidence of an identity of a user, and the user recognition component 295 may utilize determinations from additional components to determine an identity of a user. The vision component 1608 can be used in conjunction with other components to determine an identity of a user. For example, the user recognition component 295 may use data from the vision component 1608 with data from the audio component 1610 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1612. For example, the biometric component 1612 may receive data corresponding to fingerprints, iris or retina scans, thermal scans, weights of users, a size of a user, pressure (e.g., within floor sensors), etc., and may determine a biometric profile corresponding to a user. The biometric component 1612 may distinguish between a user and sound from a television, for example. Thus, the biometric component 1612 may incorporate biometric information into a confidence level for determining an identity of a user. Biometric information output by the biometric component 1612 can be associated with specific user profile data such that the biometric information uniquely identifies a user profile of a user.

The radio frequency (RF) component 1614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1614 the strength of the signal (e.g., as a received signal strength indication (RSSI)). The RF component 1614 may use the RSSI to determine an identity of a user (with an associated confidence level). In some instances, the RF component 1614 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1616 may track the behavior of various users as a factor in determining a confidence level of the identity of the user. By way of example, a user may adhere to a regular schedule such that the user is at a first location during the day (e.g., at work or at school). In this example, the ML component 1616 would factor in past behavior and/or trends in determining the identity of the user that provided input to the device 110 and/or the system(s) 120. Thus, the ML component 1616 may use historical data and/or usage patterns over time to increase or decrease a confidence level of an identity of a user.

In at least some instances, the recognition confidence component 1618 receives determinations from the various components 1608, 1610, 1612, 1614, and 1616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1695.

The audio component 1610 may receive data from one or more sensors capable of providing an audio signal (e.g., one or more microphones) to facilitate recognition of a user. The audio component 1610 may perform audio recognition on an audio signal to determine an identity of the user and associated user identifier. In some instances, aspects of device 110 and/or the system(s) 120 may be configured at a computing device (e.g., a local server). Thus, in some instances, the audio component 1610 operating on a computing device may analyze all sound to facilitate recognition of a user. In some instances, the audio component 1610 may perform voice recognition to determine an identity of a user.

The audio component 1610 may also perform user identification based on audio data 211 input into the device 110 and/or the system(s) 120 for speech processing. The audio component 1610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1610 may perform user recognition by comparing speech characteristics represented in the audio data 211 to stored speech characteristics of users (e.g., stored voice profiles associated with the device 110 that captured the spoken user input).

Figure 17:
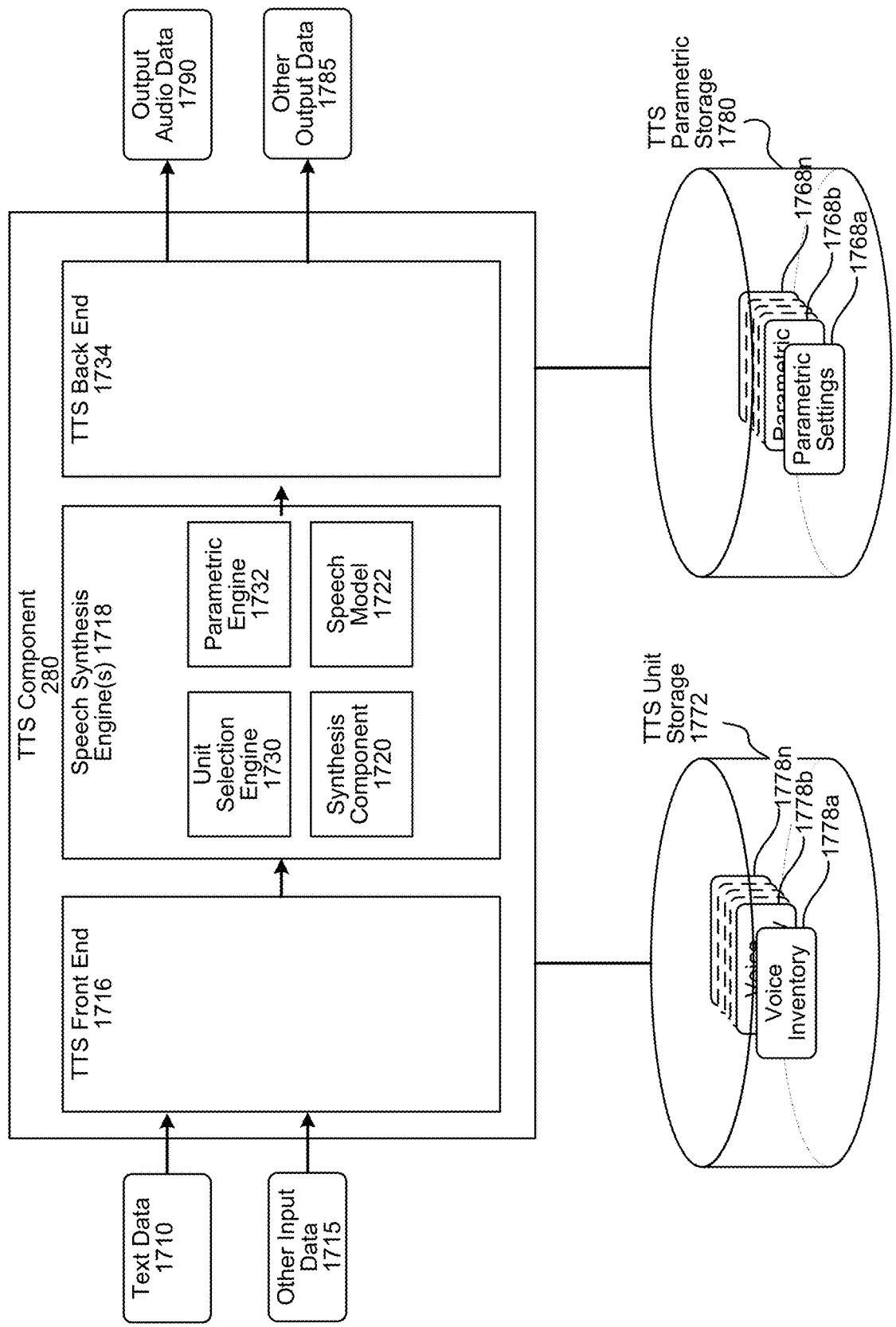
FIG. 17 is a conceptual diagram of text-to-speech components according to embodiments of the present disclosure.

Components of a system that may be used to perform unit selection, parametric TTS processing, and/or model-based audio synthesis are shown in FIG. 17. As shown in FIG. 17, the TTS component/processor 280 may include a TTS front end 1716, a speech synthesis engine 1718, TTS unit storage 1772, TTS parametric storage 1780, and a TTS back end 1734. The TTS unit storage 1772 may include, among other things, voice inventories 1778*a*-1778*n* that may include pre-recorded audio segments (called units) to be used by the unit selection engine 1730 when performing unit selection synthesis as described below. The TTS parametric storage 1780 may include, among other things, parametric settings 1768*a*-1768*n* that may be used by the parametric synthesis engine 1732 when performing parametric synthesis as described below. A particular set of parametric settings 1768 may correspond to a particular voice profile (e.g., whispered speech, excited speech, etc.).

In some embodiments, the system 120 may leverage the voice inventories 1778 and/or parametric settings 1768 to provide different assistants with different personalities as reflected in respective speech styles. For example, a first assistant could be associated with a first voice inventory 1778*a* and first parametric settings 1768*a*, and a second assistant could be associated with a second voice inventory 1778*b* and second parametric settings 1768*b*. Thus, the system 100 call the TTS component 280 for synthesized speech generation based on a particular assistant, and the TTS component 280 may return synthesized speech in a speech style indicative with that assistant. The user will thus be able to tell with which assistant he or she is interacting with at a given time based on the speech style of the synthetic voice alone. A change in the speech style of the synthetic voice can indicate to the user that a handoff from one assistant to another will or has occurred.

For example, the system 100 may receive a command with an indication that the first assistant is the requested assistant to handle the command. The system 100 may, however, select the second assistant as better able to handle the command. The system 100 may call the TTS component 280 to generate a first message as the first assistant to indicate that the command will be handled by the second assistant. The TTS component 280 may thus return a handoff message in a first speech style corresponding to the first assistant. The system may then call the TTS component 280 to generate a second message as the second assistant to convey a result corresponding to the command. The TTS component 280 may thus return a response message in a second speech style corresponding to the second assistant.

In various embodiments of the present disclosure, model-based synthesis of audio data may be performed using by a speech model 1722 and a TTS front end 1716. The TTS front end 1716 may be the same as front ends used in traditional unit selection or parametric systems. In other embodiments, some or all of the components of the TTS front end 1716 are based on other trained models. The present disclosure is not, however, limited to any particular type of TTS front end 1716. The speech model 1722 may be used to synthesize speech without requiring the TTS unit storage 1772 or the TTS parametric storage 1780, as described in greater detail below.

TTS component receives text data 1710. Although the text data 1710 in FIG. 17 is input into the TTS component 280, it may be output by other component(s) (such as a skill 290, NLU component 260, NLG component 279 or other component) and may be intended for output by the system. Thus in certain instances text data 1710 may be referred to as "output text data." Further, the data 1710 may not necessarily be text, but may include other data (such as symbols, code, other data, etc.) that may reference text (such as an indicator of a word) that is to be synthesized. Thus data 1710 may come in a variety of forms. The TTS front end 1716 transforms the data 1710 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1716 may also process other input data 1715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1710 and/or the text for a TTS request may be accompanied by separate metadata indicating what text should be whispered (or have some other indicated audio characteristic). The speech synthesis engine 1718 may compare the annotated phonetic units models and information stored in the TTS unit storage 1772 and/or TTS parametric storage 1780 for converting the input text into speech. The TTS front end 1716 and speech synthesis engine 1718 may include their own controller(s)/processor(s) and memory or they may use the controller/processor and memory of the server 120, device 110, or other device, for example. Similarly, the instructions for operating the TTS front end 1716 and speech synthesis engine 1718 may be located within the TTS component 280, within the memory and/or storage of the server 120, device 110, or within an external device.

Text data 1710 input into the TTS component 280 may be sent to the TTS front end 1716 for processing. The TTS front end 1716 may include components for performing text normalization, linguistic analysis, linguistic prosody generation, or other such components. During text normalization, the TTS front end 1716 may first process the text input and generate standard text, converting such things as numbers, abbreviations (such as Apt., St., etc.), symbols ($, %, etc.) into the equivalent of written out words.

During linguistic analysis, the TTS front end 1716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1772. The linguistic analysis performed by the TTS front end 1716 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1716 may then perform linguistic prosody generation where the phonetic units are annotated with desired prosodic characteristics, also called acoustic features, which indicate how the desired phonetic units are to be pronounced in the eventual output speech. During this stage the TTS front end 1716 may consider and incorporate any prosodic annotations that accompanied the text input to the TTS component 280.

Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1716, which may be referred to as a symbolic linguistic representation, may include a sequence of phonetic units annotated with prosodic characteristics. This symbolic linguistic representation may be sent to the speech synthesis engine 1718, which may also be known as a synthesizer, for conversion into an audio waveform of speech for output to an audio output device and eventually to a user. The speech synthesis engine 1718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1718 may perform speech synthesis using one or more different methods. In one method of synthesis called unit selection, described further below, a unit selection engine 1730 matches the symbolic linguistic representation created by the TTS front end 1716 against a database of recorded speech, such as a database (e.g., TTS unit storage 1772) storing information regarding one or more voice corpuses (e.g., voice inventories 1778a-n). Each voice inventory may correspond to various segments of audio that was recorded by a speaking human, such as a voice actor, where the segments are stored in an individual inventory 1778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1730 may then use the information about each unit to select units to be joined together to form the speech output.

The unit selection engine 1730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1720) to form output audio data 1790 representing synthesized speech. Using all the information in the unit database, a unit selection engine 1730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1772 based on feedback of the results of TTS processing, thus enabling the TTS component 280 to improve speech synthesis.

The TTS unit storage 1772 may be customized for an individual user based on his/her individualized desired speech output. In particular, the speech unit stored in a unit database may be taken from input audio data of the user speaking. For example, to create the customized speech output of the system, the system may be configured with multiple voice inventories 1778a-1778n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1730. As part of unit selection, the unit selection engine 1730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1772 or in another storage component. For example, different unit selection databases may be stored in TTS unit storage 1772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1716.

The parametric synthesis engine 1732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1718, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1732 may lead to a number of potential audio output sequences. Based on the acoustic model and other potential models, the potential audio output sequences may be scored according to a confidence level of the parametric synthesis engine 1732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1768, which may represent acoustic settings matching a particular parametric "voice", may be used by the synthesis component 1720 to ultimately create the output audio data 1790.

When performing unit selection, after a unit is selected by the unit selection engine 1730, the audio data corresponding to the unit may be passed to the synthesis component 1720. The synthesis component 1720 may then process the audio data of the unit to create modified audio data where the modified audio data reflects a desired audio quality. The synthesis component 1720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1720 may process the audio data for that unit to create a modified unit audio data. The modified unit audio data may then be concatenated to form the output audio data 1790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1785 may be output along with the output audio data 1790 so that an ultimate playback device (e.g., device 110) receives instructions for playback that can assist in creating the desired output audio. Thus, the other output data 1785 may include instructions or other data indicating playback device settings (such as volume, playback rate, etc.) or other data indicating how output audio data including synthesized speech should be output. For example, for whispered speech, the output audio data 1790 may include other output data 1785 that may include a prosody tag or other indicator that instructs the device 110 to slow down the playback of the output audio data 1790, thus making the ultimate audio sound more like whispered speech, which is typically slower than normal speech. In another example, the other output data 1785 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 18:
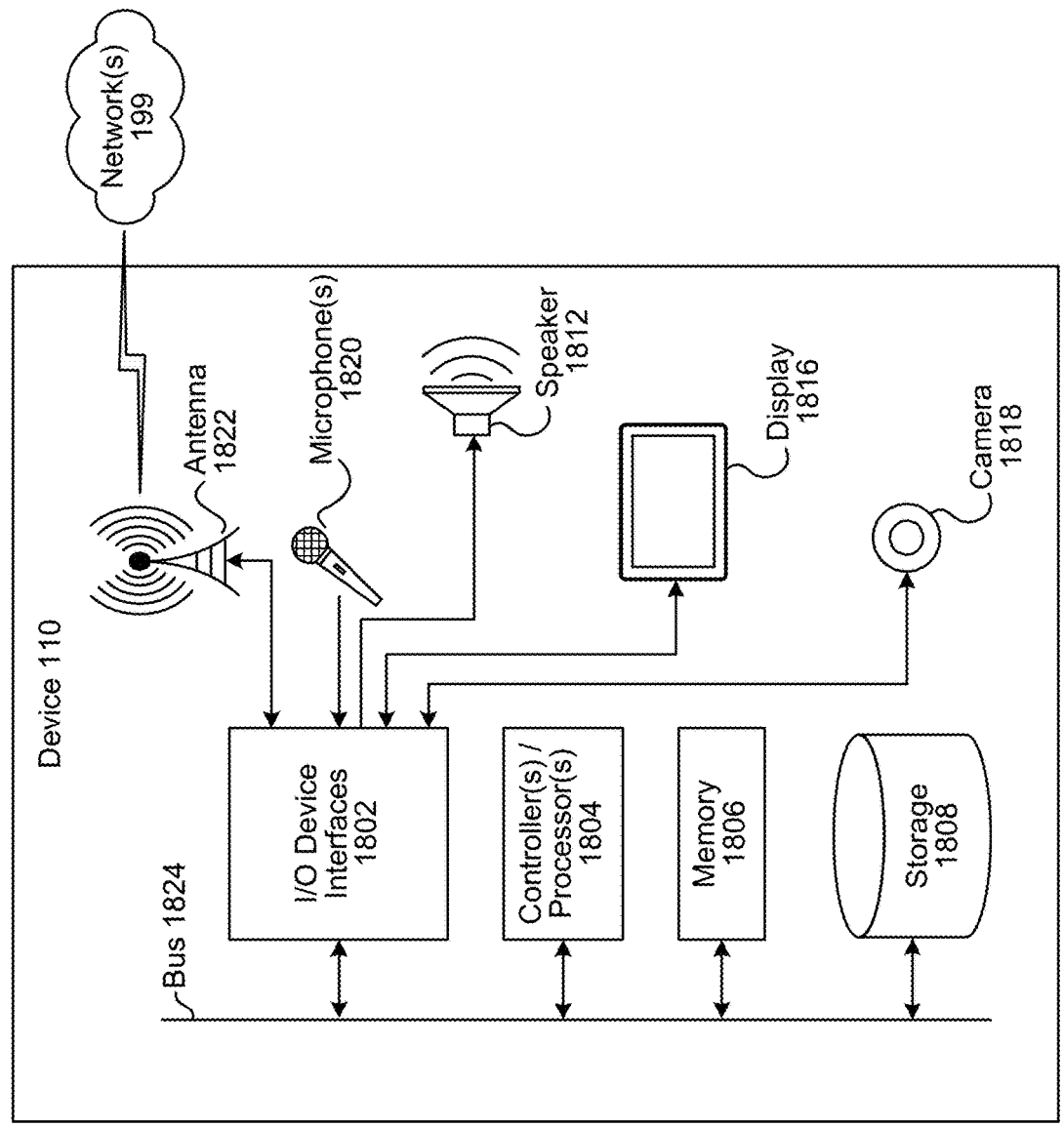
FIG. 18 is a block diagram conceptually illustrating example components of a device, according to embodiments of the present disclosure.
Figure 19:
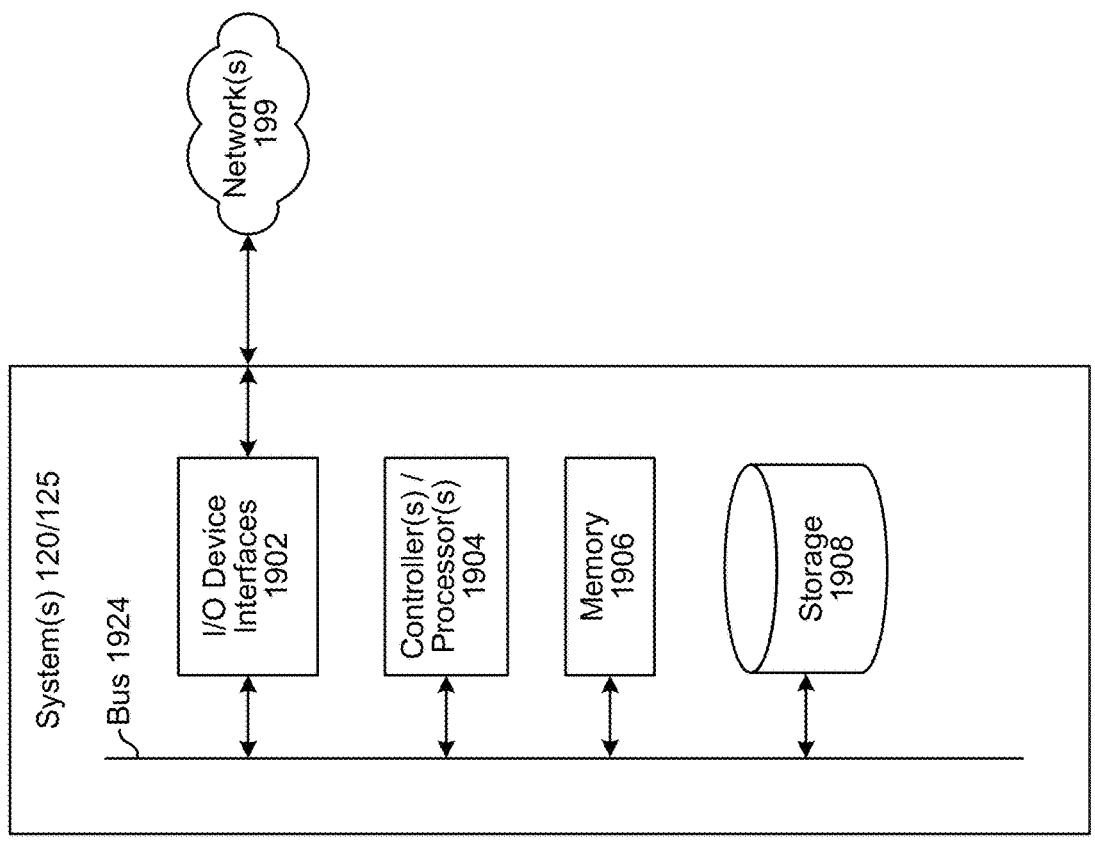
FIG. 19 is a block diagram conceptually illustrating example components of a system, according to embodiments of the present disclosure.

FIG. 18 is a block diagram conceptually illustrating a device 110 that may be used with the system. FIG. 19 is a block diagram conceptually illustrating example components of a remote device, such as the speech-processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive memory (MRAM), and/or other types of memory. Each device (110/120/125) may also include a data storage component (1808/1908) for storing data and controller/processor-executable instructions. Each data storage component (1808/1908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1802/1902).

Computer instructions for operating each device (110/120/125) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/120/125) includes input/output device interfaces (1802/1902). A variety of components may be connected through the input/output device interfaces (1802/1902), as will be discussed further below. Additionally, each device (110/120/125) may include an address/data bus (1824/1924) for conveying data among components of the respective device. Each component within a device (110/120/125) may also be directly connected to other components in addition to (or instead of) being connected to other components across the bus (1824/1924).

Referring to FIG. 18, the device 110 may include input/output device interfaces 1802 that connect to a variety of components such as an audio output component such as a speaker 1812, a wired headset or a wireless headset (not illustrated), or other component capable of outputting audio. The device 110 may also include an audio capture component. The audio capture component may be, for example, a microphone 1820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1816 for displaying content. The device 110 may further include a camera 1818.

Via antenna(s) 1822, the input/output device interfaces 1802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1802/1902) may also include communication components that allow data to be exchanged between devices such as different physical servers in a collection of servers or other components.

The components of the device(s) 110, the speech-processing system 120, or a skill system 125 may include their own dedicated processors, memory, and/or storage. Alternatively, one or more of the components of the device(s) 110, the speech-processing system 120, or a skill system 125 may utilize the I/O interfaces (1802/1902), processor(s) (1804/1904), memory (1806/1906), and/or storage (1808/1908) of the device(s) 110, speech-processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the speech-processing system 120, and a skill system 125, as described herein, are illustrative, and may be located as a stand-alone device or may be included, in whole or in part, as a component of a larger device or system.

Figure 20:
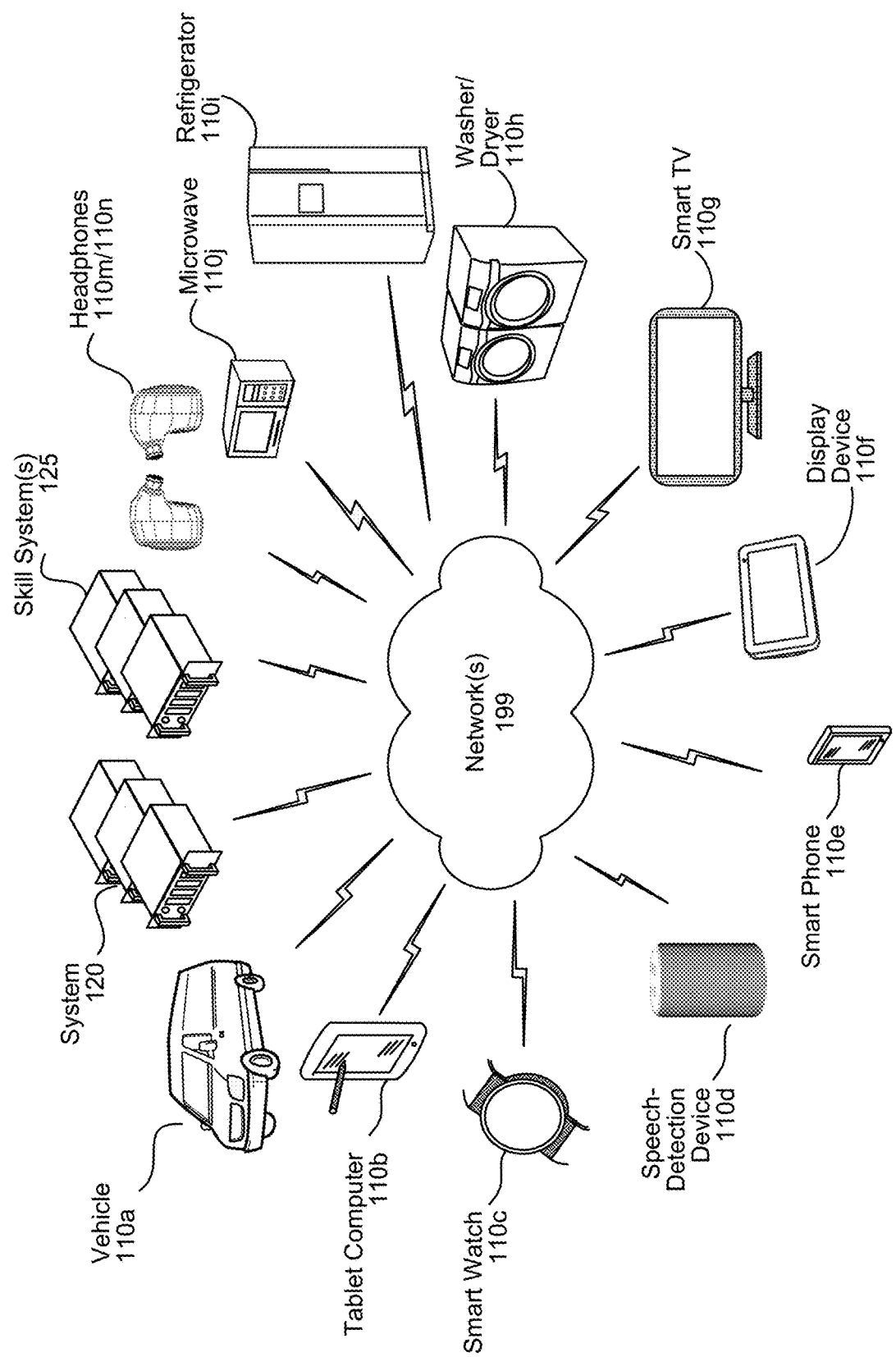
FIG. 20 illustrates an example of a computer network for use with the overall system, according to embodiments of the present disclosure.

As illustrated in FIG. 20, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a tablet computer 110b, a smart watch 110c, a speech-detection device 110d, a smart phone 110e, a display device 110f, a smart television 110g, a washer/dryer 110h, a refrigerator 110i, and/or a microwave 110j may be connected to the network(s) 199 through a wireless service provider, over a Wi-Fi 33 or cellular network connection, or the like. Other devices are included as network-connected support devices, such as the speech-processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the speech-processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

The invention claimed is:

1. A method comprising:
    detecting, by a device, a first gesture, wherein the first gesture is a non-verbal movement detectable by the device;
    receiving, by a microphone of the device, first input audio representing a spoken utterance;
    determining, using data stored by the device, that the first gesture corresponds to a first command processing subsystem (CPS), wherein the data stored by the device indicates that the first gesture represents a request to invoke the first CPS and that a second gesture represents a request to invoke a second CPS;
    outputting, by the device, a first indication that the first CPS is processing the first input audio;
    in response to determining that the first gesture corresponds to the first CPS, sending, by the device to a speech-processing system, first data representing the first input audio and a second indication that the first data is to be processed by the first CPS, the speech-processing system capable of sending input data to the first CPS and the second CPS;
    receiving, from the speech-processing system, first response data; and
    outputting, by the device, first synthesized speech in a first speech style corresponding to the first CPS.

2. The method of claim 1, further comprising, prior to receiving the first input audio:
    receiving, by the device, a first request to enable the second CPS for processing commands received by the device;
    sending, to the speech-processing system, second data representing a change to a device-specific setting of the device to enable the device to process commands using the second CPS;
    receiving, from the speech-processing system, a third indication that the device-specific setting has been updated;
    detecting, by the device, the second gesture;
    receiving second input audio;
    determining, using the data stored by the device, that the second gesture corresponds to the second CPS;
    in response to determining that the second gesture corresponds to the second CPS sending, to the speech-processing system, third data representing the second input audio and a fourth indication that the third data is to be processed by the second CPS;
    receiving, from the speech-processing system, second response data; and
    outputting, by the device, second synthesized speech in a second speech style corresponding to the second CPS.

3. The method of claim 1, further comprising, prior to receiving the first input audio:
    receiving, by the device, a first request to assign the second gesture for invoking the second CPS, wherein the second gesture is different from the first gesture;
    sending, to the speech-processing system, second data representing a change to a device-specific setting of the device to associate the second gesture with the second CPS;
    receiving, from the speech-processing system, a third indication that the device-specific setting has been updated;
    configuring the data stored by the device to include an association between the second gesture and the second CPS;
    detecting, by the device, the second gesture;
    receiving second input audio;
    determining, using the data stored by the device, that the second gesture corresponds to the second CPS;
    in response to determining that the second gesture corresponds to the second CPS, sending, to the speech-processing system, third data representing the second input audio and a fourth indication that the third data is to be processed by the second CPS;
    receiving, from the speech-processing system, second response data; and
    outputting, by the device, second synthesized speech in a second speech style corresponding to the second CPS.

4. The method of claim 1, further comprising:
    detecting, by the device, the first gesture;
    receiving second input audio;
    determining, using the data stored by the device, that the first gesture corresponds to the first CPS;
    outputting a third indication that the first CPS is processing the second input audio;

in response to determining that the first gesture corresponds to the first CPS, sending, to the speech-processing system, second data representing the second input audio and a fourth indication that the second data is to be processed by the first CPS;
receiving, from the speech-processing system, a fifth indication that the second CPS is to process the second data;
in response to receiving the fifth indication, outputting a sixth indication that the second CPS is processing the second input audio;
receiving, from the speech-processing system, second response data; and
outputting, by the device, second synthesized speech in a second speech style corresponding to the second CPS.

5. A method comprising:
receiving, by a device, first input audio representing a spoken utterance;
detecting, by the device, a first wake command;
determining, using data stored by the device, that the first wake command corresponds to a first command processing subsystem (CPS), wherein the data stored by the device indicates that the first wake command represents a request to invoke the first CPS and that a second wake command represents a request to invoke a second CPS;
in response to determining that the first wake command corresponds to the first CPS, sending, by the device to a speech-processing system, first data representing the first input audio and a first indication that the first data is to be processed by the first CPS, the speech-processing system capable of sending input data to at least the first CPS and the second CPS;
receiving, from the speech-processing system, first response data; and
performing, by the device, a first action based on the first response data.

6. The method of claim 5, further comprising:
outputting, by the device and based on the first response data, synthesized speech in a speech style corresponding to the first CPS.

7. The method of claim 5, further comprising, prior to receiving the first input audio:
receiving, by the device, a first request to enable the second CPS for processing commands received by the device;
sending, to the speech-processing system, second data representing a change to a device-specific setting of the device to enable the device to process commands using the second CPS;
receiving, from the speech-processing system, a second indication that the device-specific setting has been updated;
receiving second input audio;
detecting the second wake command;
determining, using the data stored by the device, that the second wake command corresponds to the second CPS;
in response to determining that the second wake command corresponds to the second CPS, sending, to the speech-processing system, third data representing the second input audio and a fourth indication that the third data is to be processed by the second CPS;
receiving, from the speech-processing system, second response data; and
performing, by the device, a second action based on the second response data wherein the second response data is based on the second CPS processing the second input audio.

8. The method of claim 5, further comprising, prior to receiving the first input audio:
receiving, by the device, a first request to assign a first gesture for invoking the second CPS, wherein the first gesture is a non-verbal movement detectable by the device and corresponds to the second wake command;
sending, to the speech-processing system, second data representing a change to a device-specific setting of the device to associate the first gesture with the second CPS;
receiving, from the speech-processing system, a second indication that the device-specific setting has been updated;
configuring the data stored by the device to include an association between the second wake command and the second CPS;
detecting, by the device, the first gesture;
receiving second input audio;
determining, using the data stored by the device, that the first gesture corresponds to the second CPS;
in response to determining that the first gesture corresponds to the second CPS, sending, to the speech-processing system, third data representing the second input audio and a third indication that the third data is to be processed by the second CPS;
receiving, from the speech-processing system, second response data; and
performing, by the device, a second action based on the second response data wherein the second response data is based on the second CPS processing the second input audio.

9. The method of claim 5, further comprising:
detecting, by the device, a first gesture, wherein the first gesture is a non-verbal movement detectable by the device;
determining, using the data stored by the device, that the first gesture represents a request to invoke a default CPS;
receiving second input audio after detecting the first gesture;
detecting a first wakeword in the second input audio;
determining, using the data stored by the device, that the first wakeword is associated with the second CPS, wherein the second CPS is not the default CPS; and
in response to determining that the first wakeword is associated with the second CPS, sending, to the speech-processing system, second data representing the second input audio and a second indication that the second data is to be processed by the second CPS.

10. The method of claim 5, further comprising:
receiving, from the speech-processing system prior to receiving the first response data, a second indication that the second CPS is to process the first data; and
in response to receiving the second indication, outputting a third indication that the second CPS is processing the first input audio, wherein the first response data is based on the second CPS processing the first input audio.

11. The method of claim 10, further comprising:
outputting, by the device and based on the second indication, first synthesized speech in a speech style corresponding to the first CPS, the first synthesized speech indicating that the second CPS will process the first input audio; and outputting, by the device and based on the first response data, second synthesized speech in a second speech style corresponding to the second CPS, the second synthesized speech based on the second CPS processing the first input audio.

12. The method of claim 10, further comprising:
in response to determining that the first wake command corresponds to the first CPS, causing the device to present a first visual theme corresponding to the first CPS; and
in response to receiving the second indication, causing the device to present a second visual theme indicating that the second CPS is processing the first input audio.

13. A device, comprising:
at least one processor; and
at least one memory comprising instructions that, when executed by the at least one processor, cause the device to:
receive first input audio representing a spoken utterance;
detect a first wake command;
determine, using data stored by the device, that the first wake command corresponds to a first command processing subsystem (CPS), wherein the data stored by the device indicates that the first wake command represents a request to invoke the first CPS and that a second wake command represents a request to invoke a second CPS;
in response to determining that the first wake command corresponds to the first CPS, send, to a speech-processing system, first data representing the first input audio and a first indication that the first data is to be processed by the first CPS, the speech-processing system capable of sending input data to at least the first CPS and the second CPS;
receive, from the speech-processing system, first response data; and
perform a first action based on the first response data.

14. The device of claim 13, wherein the at least one memory further comprises instructions that, when executed by the at least one processor, further cause the device to:
output, based on the first response data, synthesized speech in a speech style corresponding to the first CPS.

15. The device of claim 13, wherein the at least one memory further comprises instructions that, when executed by the at least one processor, further cause the device to, prior to receiving the first input audio:
receive a first request to enable the second CPS for processing commands received by the device;
send, to the speech-processing system, second data representing a change to a device-specific setting of the device to enable the device to process commands using the second CPS;
receive, from the speech-processing system, a second indication that the device-specific setting has been updated;
receive second input audio;
detect the second wake command;
determine, using the data stored by the device, that the second wake command corresponds to the second CPS;
in response to determining that the second wake command corresponds to the second CPS, send, to the speech-processing system, third data representing the second input audio and a fourth indication that the third data is to be processed by the second CPS;
receive, from the speech-processing system, second response data; and
perform a second action based on the second response data wherein the second response data is based on the second CPS processing the second input audio.

16. The device of claim 13, wherein the at least one memory further comprises instructions that, when executed by the at least one processor, further cause the device to, prior to receiving the first input audio:
receive a first request to assign a first gesture for invoking the second CPS, wherein the first gesture is a non-verbal movement detectable by the device and corresponds to the second wake command;
send, to the speech-processing system, second data representing a change to a device-specific setting of the device to associate the first gesture with the second CPS;
receive, from the speech-processing system, a second indication that the device-specific setting has been updated;
configure the data stored by the device to include an association between the second wake command and the second CPS;
detect the first gesture;
receive second input audio;
determine, using the data stored by the device, that the first gesture corresponds to the second CPS;
in response to determining that the first gesture corresponds to the second CPS, send, to the speech-processing system, third data representing the second input audio and a third indication that the third data is to be processed by the second CPS;
receive, from the speech-processing system, second response data; and
perform a second action based on the second response data wherein the second response data is based on the second CPS processing the second input audio.

17. The device of claim 13, wherein the at least one memory further comprises instructions that, when executed by the at least one processor, further cause the device to:
detect a first gesture, wherein the first gesture is a non-verbal movement detectable by the device;
determine, using the data stored by the device, that the first gesture represents a request to invoke a default CPS;
receive second input audio after detecting the first gesture;
detect a first wakeword in the second input audio;
determine, using the data stored by the device, that the first wakeword is associated with the second CPS, wherein the second CPS is not the default CPS; and
in response to determining that the first wakeword is associated with the second CPS, send, to the speech-processing system, second data representing the second input audio and a second indication that the second data is to be processed by the second CPS.

18. The device of claim 13, wherein the at least one memory further comprises instructions that, when executed by the at least one processor, further cause the device to:
receive, from the speech-processing system prior to receiving the first response data, a second indication that the second CPS is to process the first data; and
in response to receiving the second indication, output a third indication that the second CPS is processing the first input audio, wherein the first response data is based on the second CPS processing the first input audio.

19. The device of claim 18, wherein the at least one memory further comprises instructions that, when executed by the at least one processor, further cause the device to:

output, based on the second indication, first synthesized speech in a speech style corresponding to the first CPS, the first synthesized speech indicating that the second CPS will process the first input audio; and output, based on the first response data, second synthesized speech in a second speech style corresponding to the second CPS, the second synthesized speech based on the second CPS processing the first input audio.

20. The device of claim 18, wherein the at least one memory further comprises instructions that, when executed by the at least one processor, further cause the device to:

in response to determining that the first wake command corresponds to the first CPS, present a first visual theme corresponding to the first CPS; and in response to receiving the second indication, present a second visual theme indicating that the second CPS is processing the first input audio.

* * * * *